US012617273B2

(12) United States Patent (10) Patent No.: US 12,617,273 B2
Iwata et al. (45) Date of Patent: May 5, 2026

(54) REACTION FORCE APPLICATION DEVICE

(71) Applicant: DENSO CORPORATION, Kariya-city (JP)

(72) Inventors: Rika Iwata, Kariya-city (JP); Tetsuji Yamanaka, Kariya-city (JP); Hideyuki Mori, Kariya-city (JP); Tetsuo Hariu, Kariya-city (JP); Soichi Kinouchi, Kariya-city (JP); Yushi Tsuzuki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/091,537

(22) Filed: Mar. 26, 2025

(65) Prior Publication Data

US 2025/0222763 A1 Jul. 10, 2025

Related U.S. Application Data

(63) Continuation of application No. PCT/JP2023/033017, filed on Sep. 11, 2023.

(30) Foreign Application Priority Data

Sep. 30, 2022 (JP) ................................. 2022-159059

(51) Int. Cl.
B60K 26/02 (2006.01)
(52) U.S. Cl.
CPC .................................. B60K 26/021 (2013.01)

(58) Field of Classification Search
CPC ........ B60K 2026/022; B60K 2026/023; B60K 26/021
See application file for complete search history.

(56) References Cited

U.S. PATENT DOCUMENTS 6,332,374 B1 * 12/2001 Someda ................. G01D 11/18
74/513
2011/0083528 A1 * 4/2011 Osawa ..................... G05G 5/03
74/513

(Continued)

FOREIGN PATENT DOCUMENTS

DE 102010029199 A1 * 12/2010 .............. G05G 1/44
DE 102011079375 A1 * 4/2012 .............. G05G 5/03
(Continued)

*Primary Examiner* — Daniel D Yabut
(74) *Attorney, Agent, or Firm* — Nixon & Vanderhye P.C.

(57) ABSTRACT

An actuator generates a drive force in response to energization. A lever is configured to be rotated by a drive force transmitted from the actuator to apply the reaction force to a pedal. A contact member is provided to the lever such that the contact member can be brought into contact with or separated from the pedal. The contact member is made of resin and has: a contact member main body; a contact surface portion that is formed on the contact member main body and is configured to contact the pedal; and a specific shape portion that is shaped in a form of a projection or a recess and is formed on the contact member main body at a time of molding the contact member. The specific shape portion is formed on the contact member main body at a corresponding location that is different from the contact surface portion.

7 Claims, 22 Drawing Sheets

(56) References Cited

U.S. PATENT DOCUMENTS

| | | | |
|---|---|---|---|
| 2012/0167708 A1* | 7/2012 | Brandt | G05G 5/03 |
| | | | 74/513 |
| 2013/0152725 A1* | 6/2013 | Maruyama | G05G 1/30 |
| | | | 74/513 |
| 2013/0186229 A1* | 7/2013 | Drews | G05G 1/44 |
| | | | 74/513 |
| 2014/0217658 A1 | 8/2014 | Kumazawa et al. | |

FOREIGN PATENT DOCUMENTS

| | | | | |
|---|---|---|---|---|
| JP | 5227837 | B2 | 3/1977 | |
| JP | 2008221682 | A | 9/2008 | |
| JP | 2015071378 | A | 4/2015 | |
| KR | 20130129932 | A * | 11/2013 | G10K 7/04 |

* cited by examiner

REACTION FORCE APPLICATION DEVICE

CROSS REFERENCE TO RELATED APPLICATIONS

This application is a continuation application of International Patent Application No. PCT/JP2023/033017 filed on Sep. 11, 2023, which designated the U.S. and claims the benefit of priority from Japanese Patent Application No. 2022-159059 filed on Sep. 30, 2022. The entire disclosures of all of the above applications are incorporated herein by reference.

TECHNICAL FIELD

The present disclosure relates to a reaction force application device.

BACKGROUND

Previously, a reaction force application device, which is configured to apply a reaction force against a pedal force of a human driver to a pedal of an accelerator device to be depressed by the driver, has been proposed.

For example, one previously proposed reaction force application device includes a lever which can apply the reaction force against the pedal force of the driver to an arm that rotates together with the pedal of the accelerator device. A distal end portion of the lever is provided with a rotatable member that can be brought into contact with or separated from the arm and can rotate relative to the lever.

SUMMARY

This section provides a general summary of the disclosure, and is not a comprehensive disclosure of its full scope or all of its features.

According to the present disclosure, there is provided a reaction force application device configured to apply a reaction force against a pedal force of a human driver to a pedal of an accelerator device to be depressed by the human driver. The reaction force application device includes an actuator, a lever and a contact member. The actuator is configured to generate a drive force in response to energization of the actuator. The lever is configured to be rotated by the drive force transmitted from the actuator to apply the reaction force to one of the pedal and an arm, wherein the arm is configured to be rotated integrally with the pedal.

The contact member is provided to the lever. The contact member is configured to be brought into contact with or separated from the one of the pedal and the arm. The contact member is made of resin and has: a contact member main body; a contact surface portion that is formed on the contact member main body and is configured to contact the one of the pedal and the arm; and a specific shape portion that is shaped in a form of a projection or a recess and is formed on the contact member main body at a time of molding the contact member.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
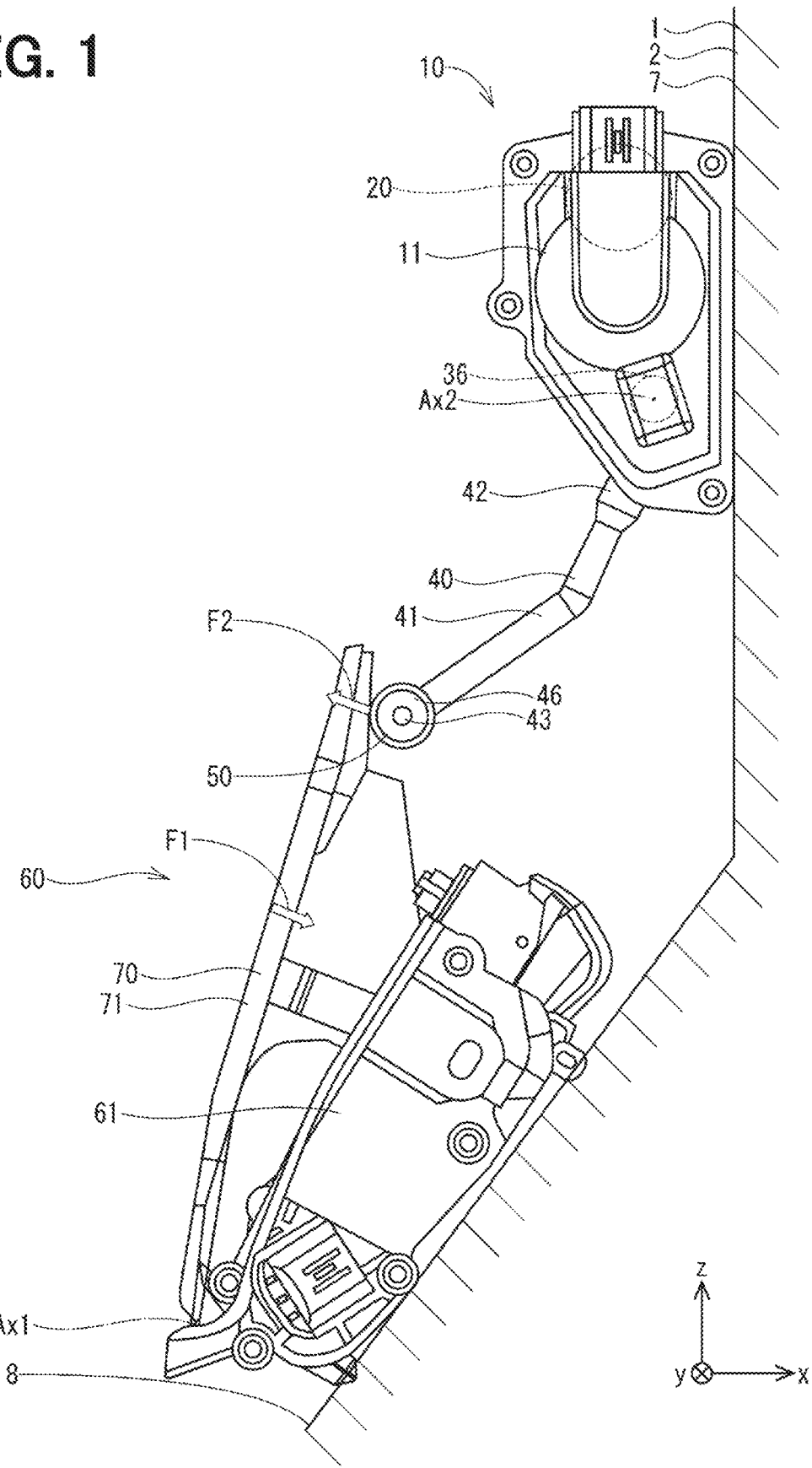
FIG. 1 is a diagram showing a reaction force application device and an accelerator device having the same according to a first embodiment.

Previously, a reaction force application device, which is configured to apply a reaction force against a pedal force of a human driver to a pedal of an accelerator device to be depressed by the driver, has been proposed.

For example, one previously proposed reaction force application device includes a lever which can apply the reaction force against the pedal force of the driver to an arm that rotates together with the pedal of the accelerator device. A distal end portion of the lever is provided with a rotatable member that can be brought into contact with or separated from the arm and can rotate relative to the lever.

In general, in the previously proposed reaction force application device, the rotatable member is a molded product made of, for example, resin and has concave or convex portions, such as a gate mark and a parting line step formed at a surface of the rotatable member during molding of the rotatable member. Therefore, in the previously proposed reaction force application device, in a case where the concave or convex portion(s) is formed at a contact portion of the rotatable member, which can come into contact with the arm, the convex or concave portion(s) may come into contact with the arm during a depressing operation of the driver for depressing the pedal, potentially generating vibrations. As a result, the vibrations may be transmitted to the driver through the arm and the pedal, potentially deteriorating the pedal force feeling of the driver.

According to the present disclosure, there is provided a reaction force application device configured to apply a reaction force against a pedal force of a human driver to a pedal of an accelerator device to be depressed by the human driver. The reaction force application device includes an actuator, a lever and a contact member. The actuator is configured to generate a drive force in response to energization of the actuator. The lever is configured to be rotated by the drive force transmitted from the actuator to apply the reaction force to one of the pedal and an arm, wherein the arm is configured to be rotated integrally with the pedal.

The contact member is provided to the lever. The contact member is configured to be brought into contact with or separated from the one of the pedal and the arm. The contact member is made of resin and has: a contact member main body; a contact surface portion that is formed on the contact member main body and is configured to contact the one of the pedal and the arm; and a specific shape portion that is shaped in a form of a projection or a recess and is formed on the contact member main body at a time of molding the contact member.

The specific shape portion is formed on the contact member main body at a corresponding location that is different from the contact surface portion. Therefore, during the depressing operation of the driver for depressing the pedal, the specific shape portion does not come into contact with the one of the pedal and the arm, thereby limiting generation of vibrations.

Hereinafter, various embodiments for a reaction force application device and an accelerator device having the same will be described with reference to the drawings. The same reference signs are given to substantially the same portions among the embodiments, and the redundant description thereof will be omitted for the sake of simplicity.

First Embodiment

Figure 2:
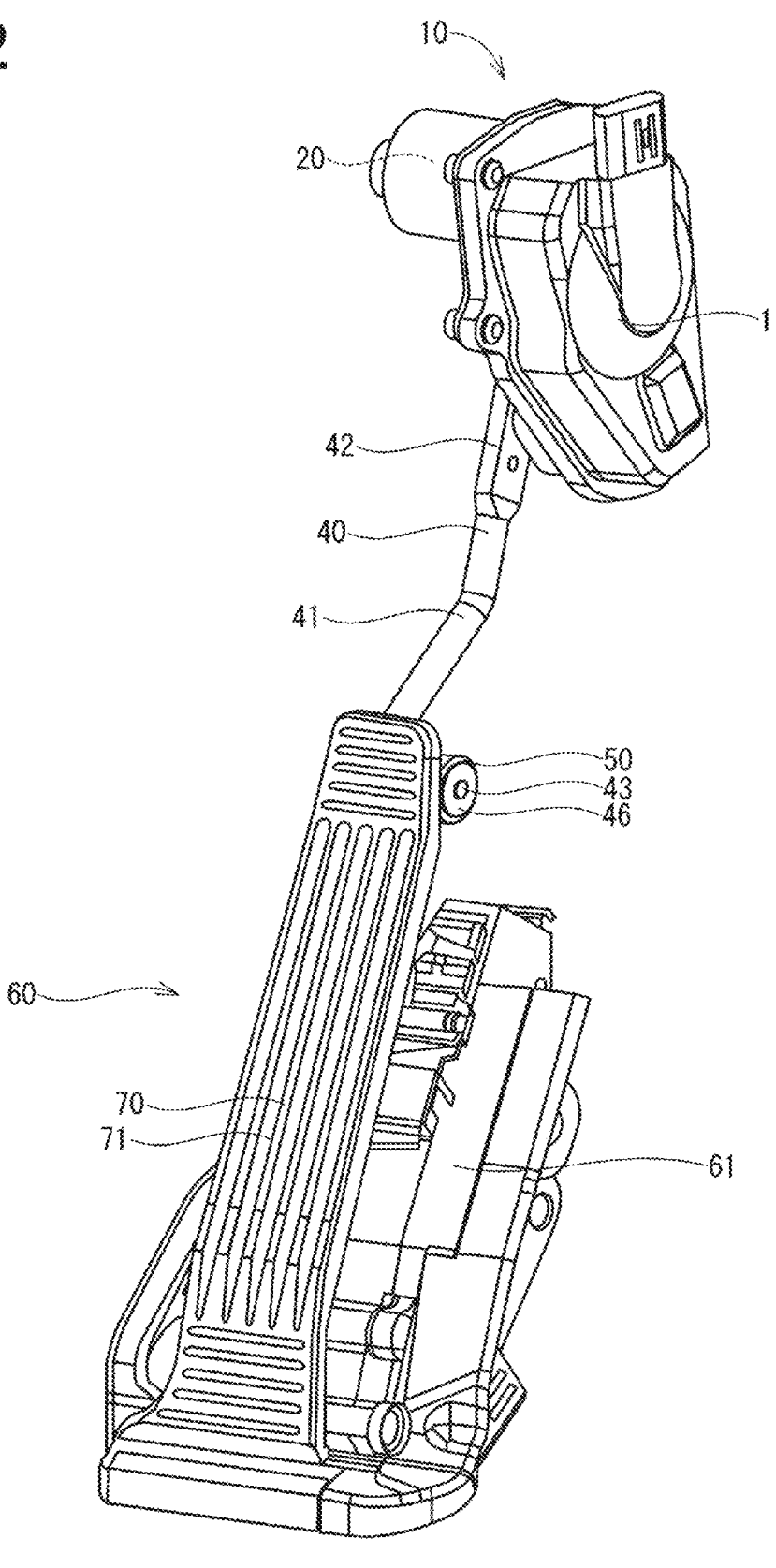
FIG. 2 is a perspective view showing the reaction force application device and the accelerator device having the same according to the first embodiment.

FIGS. 1 and 2 show a reaction force application device and an accelerator device having the same according to the first embodiment.

The accelerator device 60 is installed on a vehicle (automobile) 1 to detect an accelerator opening degree corresponding to a rotational angle of a pedal 70 operated by a human driver (hereinafter referred to as a driver) of the vehicle and control a driving state of the vehicle 1. The accelerator device 60 adopts an accelerator-by-wire system (also known as a drive-by-wire system) and is not mechanically connected to a throttle device of the vehicle 1. The accelerator device 60 transmits information regarding the accelerator opening degree corresponding to the rotational angle of the pedal 70 to an electronic control unit (hereinafter referred to as ECU) not shown in the drawing. The ECU controls the throttle device based on the accelerator opening degree transmitted from the accelerator device 60. As a result, the driving state of the vehicle 1 is controlled.

The reaction force application device 10 is installed on the vehicle 1 together with the accelerator device 60 and is configured to apply the reaction force F2 against the pedal force F1 of the driver to the pedal 70 of the accelerator device 60. The reaction force application device 10 is configured to provide a driver notification(s), such as a danger alert notification(s) and a fuel efficiency improvement notification(s), by applying the reaction force to the pedal 70 of the accelerator device 60. The reaction force application device 10 is also configured to convert the pedal 70 into a footrest by restricting the rotation of the pedal 70.

In FIG. 1, an x-axis indicates a traveling direction of the vehicle 1, and a y-axis indicates a vehicle width direction. Furthermore, a z-axis indicates a vertical upward direction. Hereinafter, unless otherwise specified, the shapes or configurations of the accelerator device 60 and the reaction force application device 10 in the installed state thereof on the vehicle 1 will be described. For example, "upper" or "upper side" means the upper or upper side in the state where the accelerator device 60 or the reaction force application device 10 is installed on the vehicle 1. In the present embodiment, a floor panel 2 has a wall surface 7, which is parallel to a y-z plane, and a wall surface 8, which is tilted relative to the wall surface 7.

The accelerator device 60 includes a pedal housing 61 and the pedal 70. The pedal housing 61 is installed on the floor panel 2 of the vehicle 1 by being fixed to the wall surface 8 of the floor panel 2 with mounting bolts (not shown), for example.

The pedal 70 is rotatably supported by the pedal housing 61 so as to rotate around a rotational axis Ax1. The pedal 70 has a pad 71 that is configured to be depressed by the driver. An accelerator opening degree sensor (not shown) is installed at the inside of the pedal housing 61. The accelerator opening degree sensor detects the accelerator opening degree corresponding to the rotational angle of the pedal 70, which is rotated by the depressing operation of the driver, and transmits it to the ECU. The rotational axis Ax1 is set to be perpendicular to the z-axis and the x-axis, and parallel to the y-axis.

A pedal urging member (not shown) is installed at the inside of the pedal housing 61. The pedal 70 is urged in an accelerator closing direction by the pedal urging member. The pedal housing 61 has: one stopper that limits the rotation of the pedal 70 in the accelerator closing direction; and another stopper that limits the rotation of the pedal 70 in the accelerator opening direction. The pedal 70 is rotatable within a range which is from a contact position, where the pedal 70 contacts the one stopper, to another contact position, where the pedal 70 contacts the other stopper. FIG. 1 shows a state where the pedal 70 is in contact with the one stopper in the accelerator closing direction, i.e., is in an accelerator fully closed state.

Figure 3:
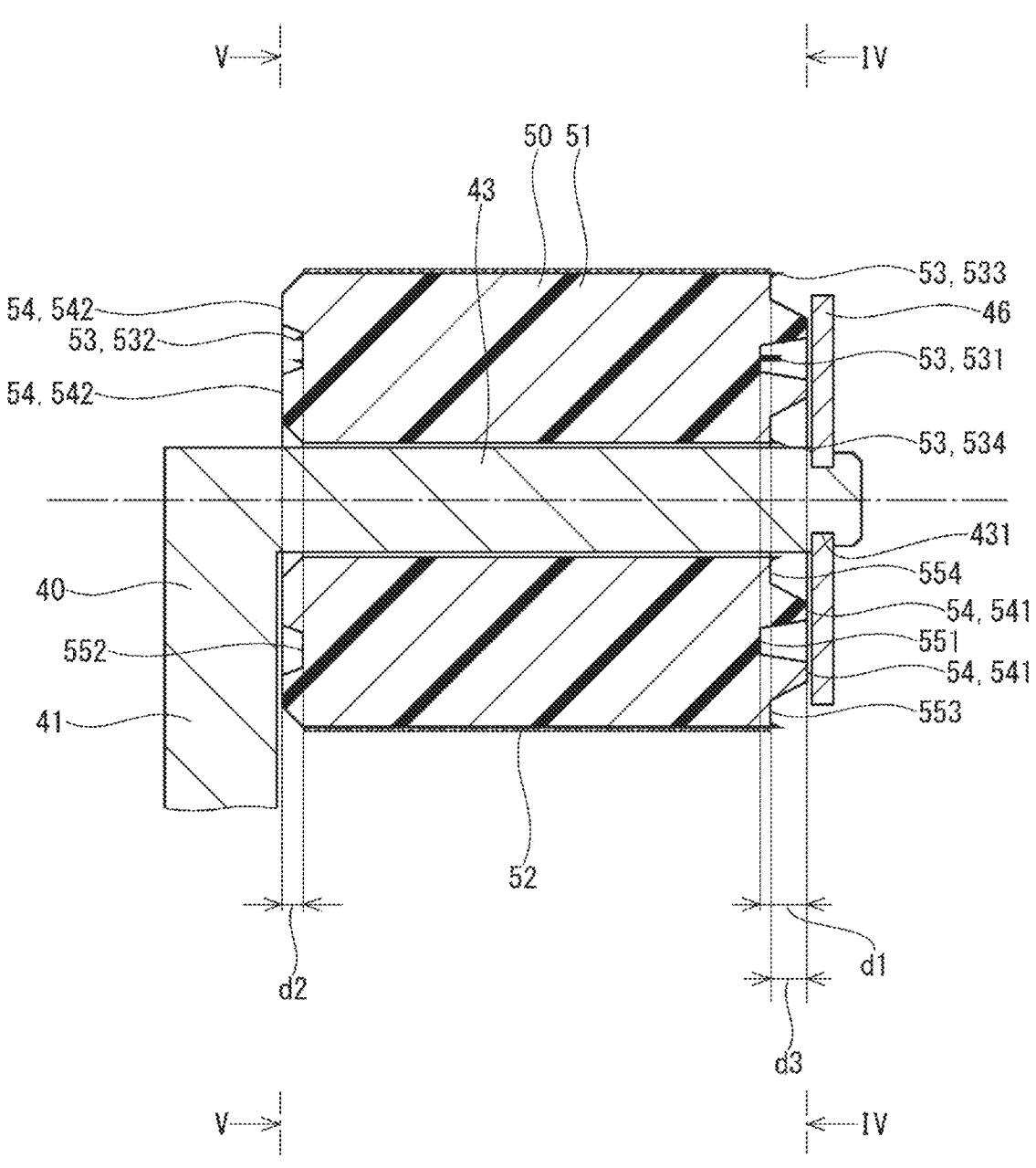
FIG. 3 is a cross-sectional view showing a contact member of the reaction force application device according to the first embodiment.

As shown in FIGS. 1 to 3, the reaction force application device 10 includes an actuator 20, a lever 40 and a contact member 50. The actuator 20 generates a drive force when the actuator 20 is energized. The lever 40 can be rotated by the drive force outputted from the actuator 20 and apply the reaction force to the pedal 70 against the pedal force of the driver.

The contact member 50 is provided to the lever 40 such that the contact member 50 can be brought into contact with or separated from the pedal 70. The contact member 50 is made of resin and has: a contact member main body 51; a contact surface portion 52 that is formed on the contact member main body 51 and is configured to contact the pedal 70; and a plurality of specific shape portions 53 that are shaped in a form of a projection or a recess and are formed on the contact member main body 51 at a time of molding the contact member 50. Each of the specific shape portions 53 is formed on the contact member main body 51 at corresponding location that is different from the contact surface portion 52.

More specifically, the reaction force application device 10 includes an actuator housing 11. The actuator housing 11 is installed on the floor panel 2 of the vehicle 1 by being fixed to the wall surface 7 of the floor panel 2 with mounting bolts (not shown), for example.

The actuator 20 is, for example, an electric motor and is received in the actuator housing 11. The actuator 20 can output torque as the drive force when the actuator 20 is energized. The ECU can control the energization of the actuator 20 and thereby control the operation of the actuator 20. The actuator housing 11 receives a speed reducer that includes a plurality of gears (not shown). The speed reducer can reduce a rotational speed of the rotation outputted from the actuator 20 and output the torque from a shaft member 36 as rotation. The shaft member 36 is installed on the rotational axis Ax2 and is rotatably supported by the actuator housing 11 around the rotational axis Ax2.

The lever 40 has a lever main body 41, a one-side lever end portion 42, an other-side lever end portion 43. The lever main body 41 is made of, for example, metal and is shaped in a rod form. The one-side lever end portion 42 is joined to one end of the lever main body 41 and is formed integrally with the lever main body 41 in one-piece. The other-side lever end portion 43 is joined to the other end of the lever main body 41 and is formed integrally with the lever main body 41 in one-piece. The other-side lever end portion 43 is formed to be approximately perpendicular to the lever main body 41. The other-side lever end portion 43 extends in parallel with the y-axis.

The lever 40 is arranged such that the one-side lever end portion 42 is joined to the shaft member 36. As a result, the lever 40 is rotatably supported by the actuator housing 11 such that the lever 40 is rotatable around the rotational axis Ax2 together with the shaft member 36. The lever 40 is rotated around the rotational axis Ax2 by the drive force outputted from the actuator 20 through the shaft member 36.

As shown in FIG. 1, the reaction force application device 10 is arranged such that an outer peripheral wall of the contact member 50 can be brought into contact with or separated from a surface of the pedal 70 of the accelerator device 60 positioned on the floor panel 2 side. Therefore, the reaction force application device 10 can apply the reaction force F2 to the pedal 70 against the pedal force F1 of the driver through the contact member 50 from the lever 40 which is rotated by the drive force outputted from the actuator 20.

Next, the contact member 50 will be explained in more detail.

Figure 4:
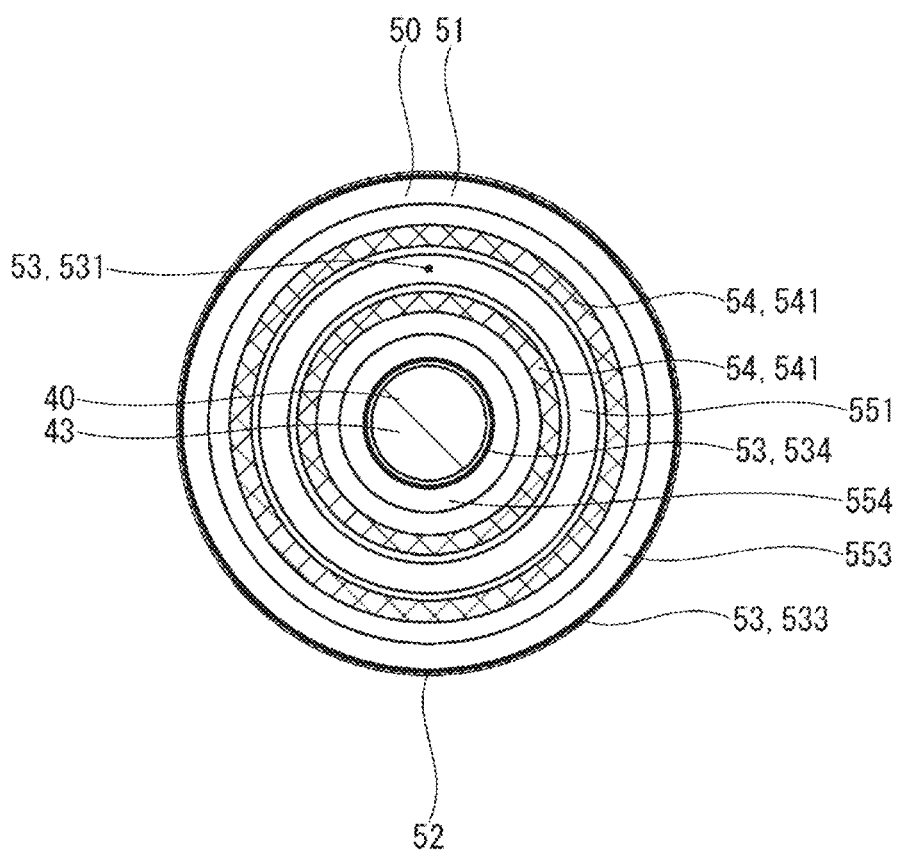
FIG. 4 is a cross-sectional view taken along line IV-IV in FIG. 3.
Figure 5:
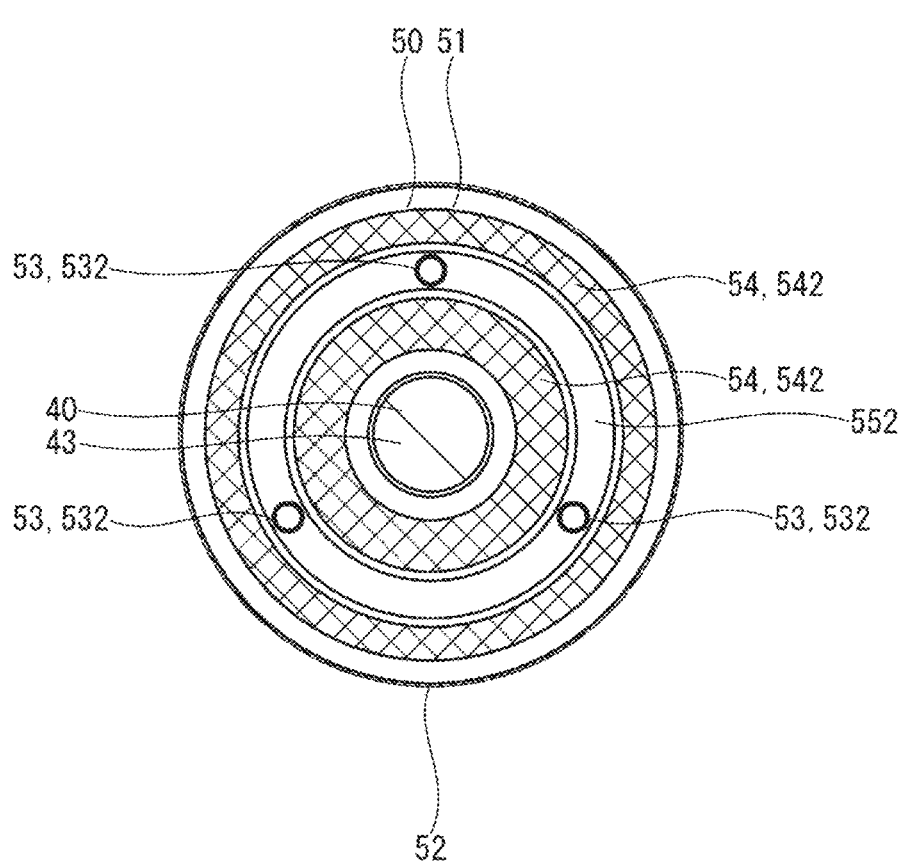
FIG. 5 is a cross-sectional view taken along line V-V in FIG. 3.

As shown in FIGS. 3 to 5, the contact member 50 has a plurality of slidable surface portions 54 that are formed on the contact member main body 51. The slidable surface portions 54 are rotatable relative to the lever 40 and is slidable relative to another member. Each of the specific shape portions 53 is formed on the contact member main body 51 at a corresponding location that is different from the slidable surface portions 54.

More specifically, the contact member 50 has a member recess 551, a member recess 552, a member recess 553 and a member recess 554. The contact member main body 51 is shaped generally in a cylindrical tubular form. The member recess 551 is shaped in an annular form and is axially recessed from an end surface of the contact member main body 51 which is opposite to the lever main body 41 (see FIGS. 3 and 4). The member recess 552 is shaped in an annular form and is axially recessed from the end surface of the contact member main body 51 which faces the lever main body 41 (see FIGS. 3 and 5). The member recess 553 is shaped in an annular form and is axially recessed from an outer periphery of the end surface of the contact member main body 51 which is opposite to the lever main body 41 (see FIGS. 3 and 4). The member recess 554 is shaped in an annular form and is axially recessed in the axial direction from an inner periphery of the end surface of the contact member main body 51 which is opposite to the lever main body 41 (see FIGS. 3 and 4). An outer periphery and an inner periphery of the end surface of the contact member main body 51, which faces the lever main body 41, are chamfered (see FIGS. 3 and 5).

A specific shape portion 531 is a gate mark shaped in a convex form formed on the contact member main body 51 during the molding and is located at a bottom surface of the member recess 551 (see FIGS. 3 and 4). Each of a plurality of specific shape portions 532 is an ejector pin mark shaped in an annular convex form formed on the contact member main body 51 during the molding and is located at the bottom surface of the member recess 552 (see FIGS. 3 and 5). The number of the specific shape portions 532 is three, and these three specific shape portions 532 are arranged at equal intervals in a circumferential direction at the member recess 552 (see FIG. 5). A specific shape portion 533 is a burr shaped in an annular convex form formed on the contact member main body 51 during the molding and projects from an outer periphery of the member recess 553 toward the side opposite to the lever main body 41 (see FIGS. 3 and 4). A specific shape portion 534 is a burr shaped in an annular convex form formed on the contact member main body 51 during the molding and projects from an inner periphery of the member recess 554 toward the side opposite to the lever main body 41 (see FIGS. 3 and 4).

An inner diameter of the contact member main body 51 is larger than an outer diameter of the other-side lever end portion 43. Therefore, the contact member 50 is rotatable relative to and is axially movable relative to the other-side lever end portion 43.

The lever 40 has a retaining stopper 46. The retaining stopper 46 is made of, for example, metal and is shaped in an annular plate form. An engaging groove 431 is formed at the other-side lever end portion 43. At the opposite side of the contact member 50, which is opposite to the lever main body 41, the engaging groove 431 is radially inwardly recessed in an annular form from an outer peripheral wall of an end part of the other-side lever end portion 43 which is opposite to the lever main body 41.

The retaining stopper 46 is provided to the other-side lever end portion 43 such that an inner periphery of the retaining stopper 46 is fitted into and is engaged with the engaging groove 431. This configuration limits the contact member 50 from falling off the other-side lever end portion 43.

In the present embodiment, the contact surface portion 52, which is a surface that can be brought into contact with the pedal 70, is formed on the entire outer peripheral wall (also referred to as a specific range of the outer peripheral wall) of the contact member main body 51 (see FIGS. 3 and 4). Two slidable surface portions 541, each of which is a surface slidable relative to the retaining stopper 46 (serving as another member), are shaped in an annular form and are positioned on a radially outer side and a radially inner side, respectively, of the member recess 551 (see FIGS. 3 and 4). Two slidable surface portions 542, each of which is a surface slidable relative to the lever main body 41 (serving as another member) of the lever 40, are shaped in an annular form and are positioned on a radially outer side and a radially inner side, respectively, of the member recess 552 (see FIGS. 3 and 5). The contact surface portion 52, the slidable surface portions 541 and the slidable surface portions 542 are formed in shaded areas (specific ranges) shown in the drawings (hereinafter the same).

As described above, each of the specific shape portions 53 is formed on the contact member main body 51 at the corresponding location that is different from the contact surface portion 52 and also different from the slidable surface portions 541 and the slidable surface portions 542.

In the present embodiment, a depth d1 of the member recess 551 is larger than a projecting height of the specific shape portion 531. A depth d2 of the member recess 552 is larger than a projecting height of each of the specific shape portions 532. A depth d3 of each of the member recess 553 and the member recess 554 is larger than a projecting height of the specific shape portion 533 and a projecting height of the specific shape portion 534 (see FIG. 3). Therefore, for example, during the rotation of the contact member 50, the specific shape portions 531, the specific shape portion 533 and the specific shape portion 534 can be limited from contacting the retaining stopper 46, and the specific shape portions 532 can be limited from contacting the lever main body 41.

Figure 6:
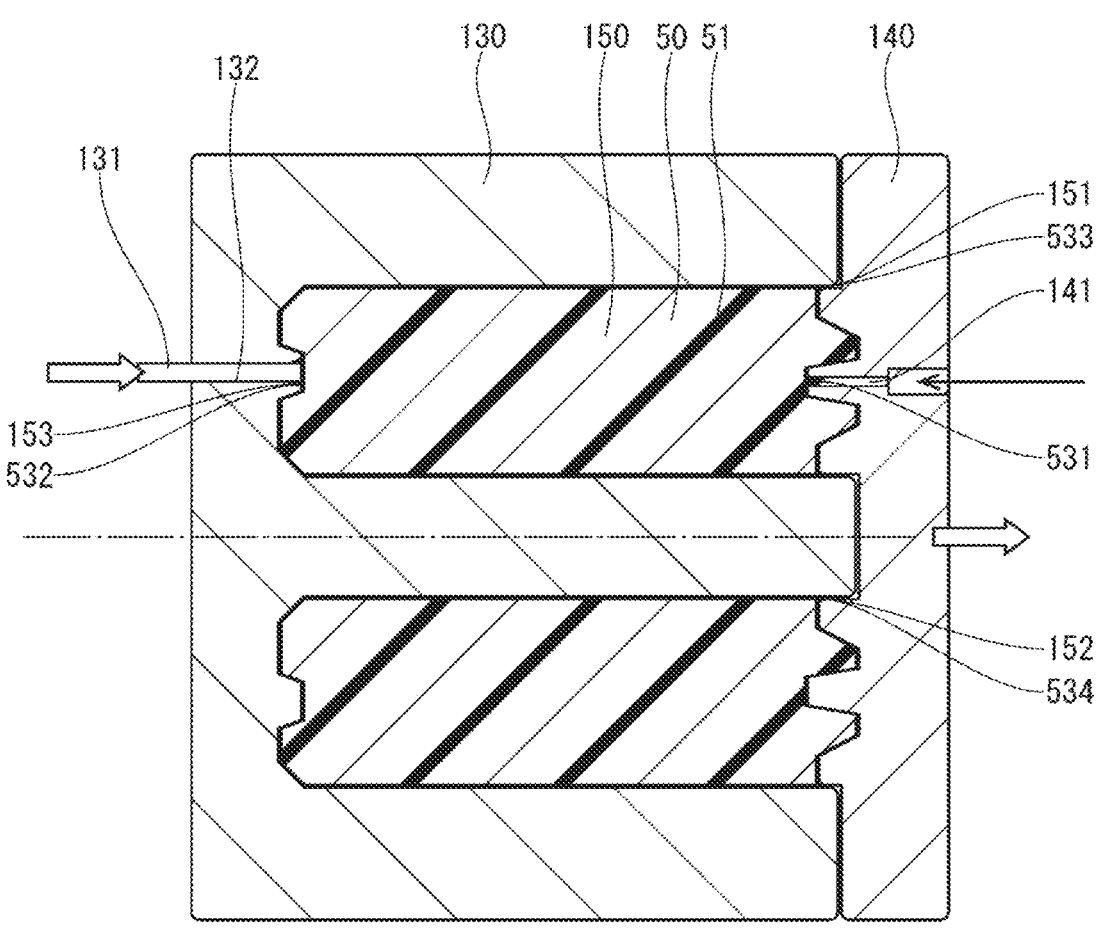
FIG. 6 is a cross-sectional view showing a molding process of the contact member of the reaction force application device according to the first embodiment.

Next, a molding process of the contact member 50 will be described with reference to FIG. 6.

First, a movable main mold 140 is fitted to a stationary main mold 130, thereby forming a cavity 150 between the stationary main mold 130 and the movable main mold 140. The cavity 150 corresponds to the shape of the contact member 50. Next, molten resin is filled into the cavity 150 through a gate 141 formed in the movable main mold 140. After the resin filled into the cavity 150 cools and solidifies, the movable main mold 140 is moved toward a side opposite to the stationary main mold 130. Next, a plurality of ejector pins 131, which are provided in the stationary main mold 130, are pressed to eject the contact member 50 from the stationary main mold 130. This completes the molding of the contact member 50.

Next, a formation process of the specific shape portions 53 during the molding of the contact member 50 will be explained.

In the state where the resin filled into the cavity 150 has cooled and solidified, when the movable main mold 140 is moved to the side opposite to the stationary main mold 130, the remaining resin in the gate 141 is torn off, forming the specific shape portion 531 as the convex gate mark.

In the state where the stationary main mold 130 and the movable main mold 140 are fitted together, an inter-mold gap 151 shaped in an annular form is formed at an outer periphery of a surface of the cavity 150 shaped in a cylindrical tubular form adjacent to the movable main mold 140, and an inter-mold gap 152, which is shaped in an annular form, is formed at an inner periphery of the surface of the cavity 150 adjacent to the movable main mold 140. Therefore, during the molding of the contact member 50, a part of the resin, which is filled into the cavity 150, enters the inter-mold gap 151 and the inter-mold gap 152. When the resin has cooled and solidified, the specific shape portion 533 and the specific shape portion 534, which are the annular convex burrs, are formed.

In a state where the ejector pins 131 are respectively received in a plurality of pin holes 132 of the stationary main mold 130, an annular pin-to-mold gap 153 is formed between: a portion of each pin hole 132 located at a surface of the cavity 150 on the side opposite to the movable main mold 140; and the ejector pin 131. Therefore, during the molding of the contact member 50, a part of the resin, which is filled into the cavity 150, enters the pin-to-mold gaps 153. When the resin in each of the pin-to-mold gaps 153 has cooled and solidified, the specific shape portion 532, which serves as the ejector pin mark, is formed.

As described above, according to the present embodiment, the contact member 50 is made of the resin and has: the contact member main body 51; the contact surface portion 52 that is formed on the contact member main body 51 and is configured to contact the pedal 70; and the plurality of specific shape portions 53 that are respectively shaped in the form of projection or recess and are formed on the contact member main body 51 at the time of molding the contact member 50. Each of the specific shape portions 53 is formed on the contact member main body 51 at the corresponding location that is different from the contact surface portion 52.

Each of the specific shape portions 53 is formed on the contact member main body 51 at the corresponding location that is different from the contact surface portion 52. Therefore, during the depressing operation of the driver for depressing the pedal 70, the specific shape portions 53 do not come into contact with the pedal 70, thereby limiting the generation of the vibrations. Thus, it is possible to limit the vibrations from being transmitted to the driver through the pedal 70, thereby limiting the deterioration of the pedal force feeling of the driver.

Furthermore, according to the present embodiment, the contact member 50 has the slidable surface portions 54 that are formed on the contact member main body 51, and the slidable surface portions 54 can rotate relative to the lever 40 and slide relative to the another member. Each of the specific shape portions 53 is formed on the contact member main body 51 at the corresponding location that is different from the slidable surface portions 54.

Therefore, for example, during the rotation of the contact member 50, the specific shape portions 53 can be limited from contacting the another member, thereby limiting the generation of the vibrations. Thus, it is possible to limit the vibrations from being transmitted to the driver through the another member and the pedal 70, thereby limiting the deterioration of the pedal force feeling of the driver.

Second Embodiment

Figure 7:
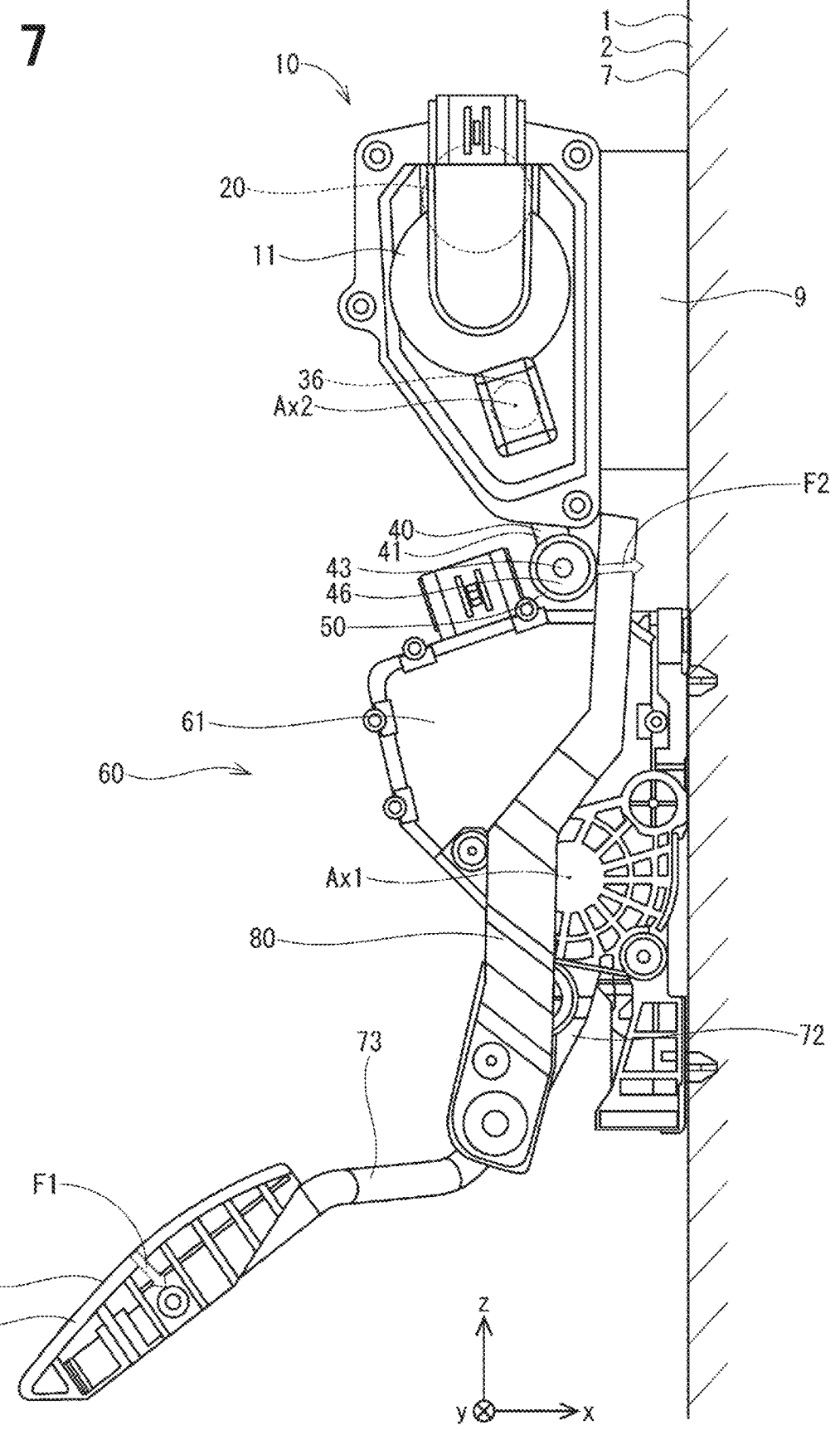
FIG. 7 is a diagram showing a reaction force application device and an accelerator device having the same according to a second embodiment.
Figure 8:
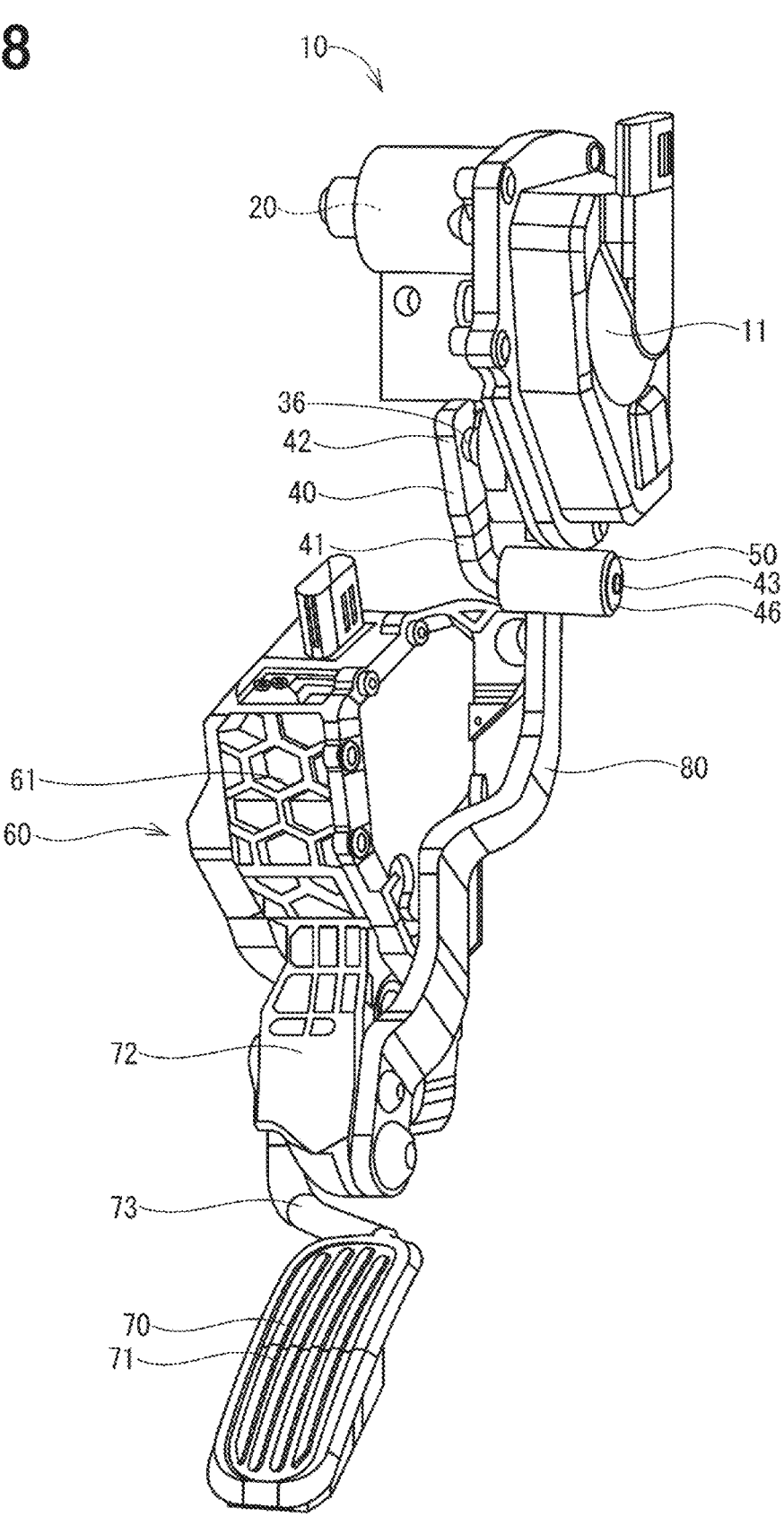
FIG. 8 is a perspective view showing the reaction force application device and the accelerator device having the same according to the second embodiment.

FIGS. 7 and 8 show a reaction force application device and an accelerator device having the same according to the second embodiment. In the second embodiment, the structure of the reaction force application device 10 and the structure of the accelerator device 60 differ from those of the first embodiment.

In the present embodiment, the pedal housing 61 of the accelerator device 60 is installed on the floor panel 2 of the vehicle 1 by being fixed to the wall surface 7 of the floor panel 2 with mounting bolts (not shown), for example.

The pedal 70 has the pad 71, a pedal base 72 and a pedal connector 73. The pedal connector 73 is made of, for example, metal and connects between the pad 71 and the pedal base 72. Here, one end of the pedal connector 73 is connected to the pad 71, and the other end of the pedal connector 73 is connected to the pedal base 72. The pedal base 72 is rotatably supported by the pedal housing 61 so as to rotate around the rotational axis Ax1. Therefore, the pedal 70 is rotatable around the rotational axis Ax1.

In the present embodiment, the accelerator device 60 further includes an arm 80. The arm 80 is formed by bending an elongated plate-shaped member made of, for example, metal at predetermined locations of the elongated plate-shaped member (see FIG. 8). The arm 80 is installed to the pedal 70 such that one end portion of the arm 80 is coupled to the pedal base 72. Therefore, the arm 80 is rotatable integrally with the pedal 70 around the rotational axis Ax1.

In the present embodiment, the actuator housing 11 of the reaction force application device 10 is fixed to a pedestal 9 installed on the wall surface 7 of the floor panel 2 of the vehicle 1 by a plurality of mounting bolts (not shown) and is thereby attached to the floor panel 2 through the pedestal 9.

In the reaction force application device 10 of the present embodiment, a length of the lever main body 41 of the lever 40 is shorter than that of the first embodiment.

As shown in FIG. 7, the reaction force application device 10 is arranged such that the outer peripheral wall of the contact member 50 can be brought into contact with or separated from a surface of the arm 80 of the accelerator device 60 opposite to the floor panel 2. Therefore, the reaction force application device 10 can apply the reaction force F2 to the pedal 70 against the pedal force F1 to the driver through the contact member 50 and the arm 80 from the lever 40 which is rotated by the drive force outputted from the actuator 20.

The rest of the present embodiment, which is other than the above-described structure, is the same as that of the first embodiment. Therefore, the structure, which is similar to the first embodiment, can achieve the same effects and advantages as the first embodiment (hereinafter the same).

Third Embodiment

Figure 9:
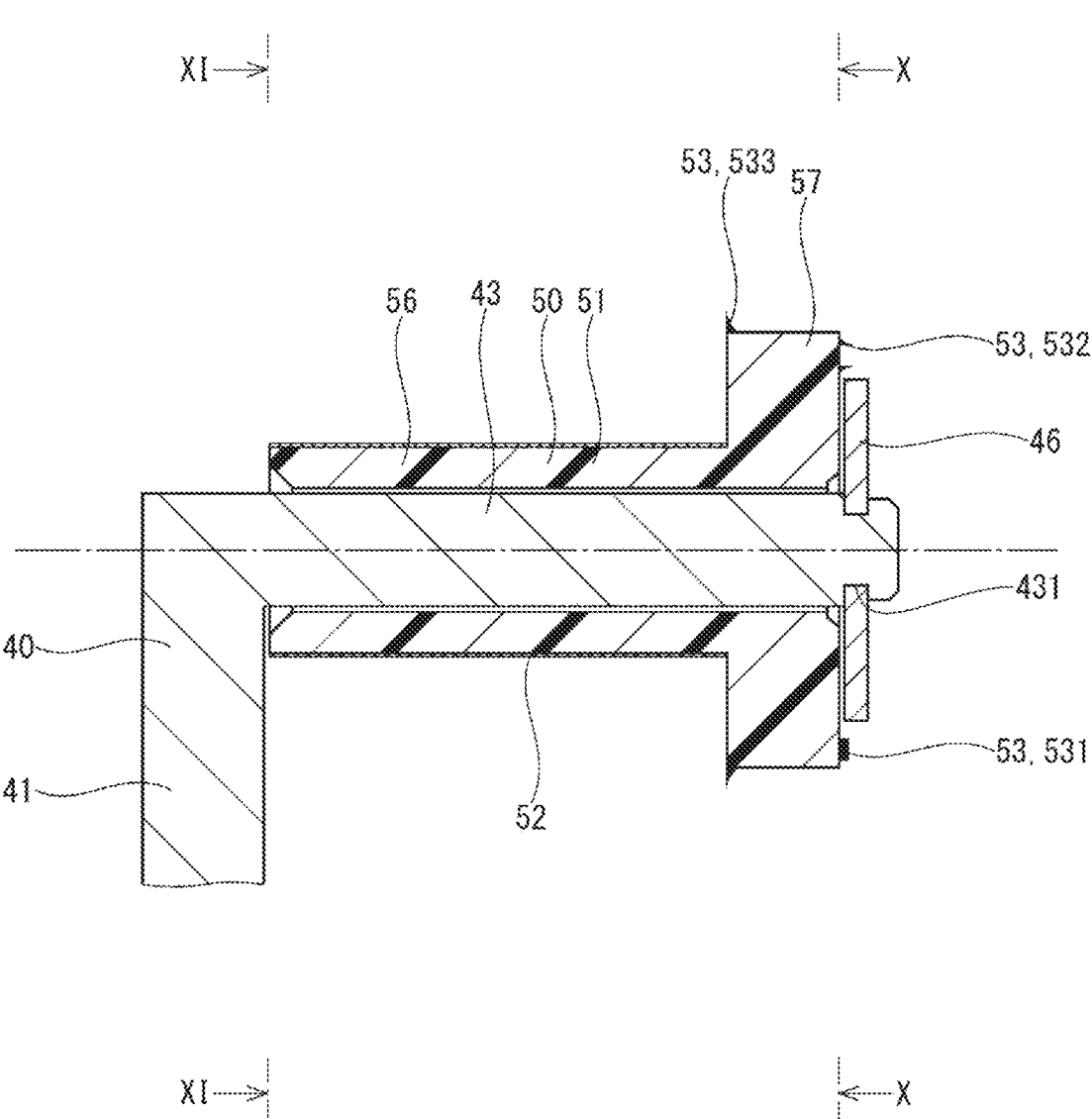
FIG. 9 is a cross-sectional view showing a contact member of a reaction force application device according to a third embodiment.
Figure 10:
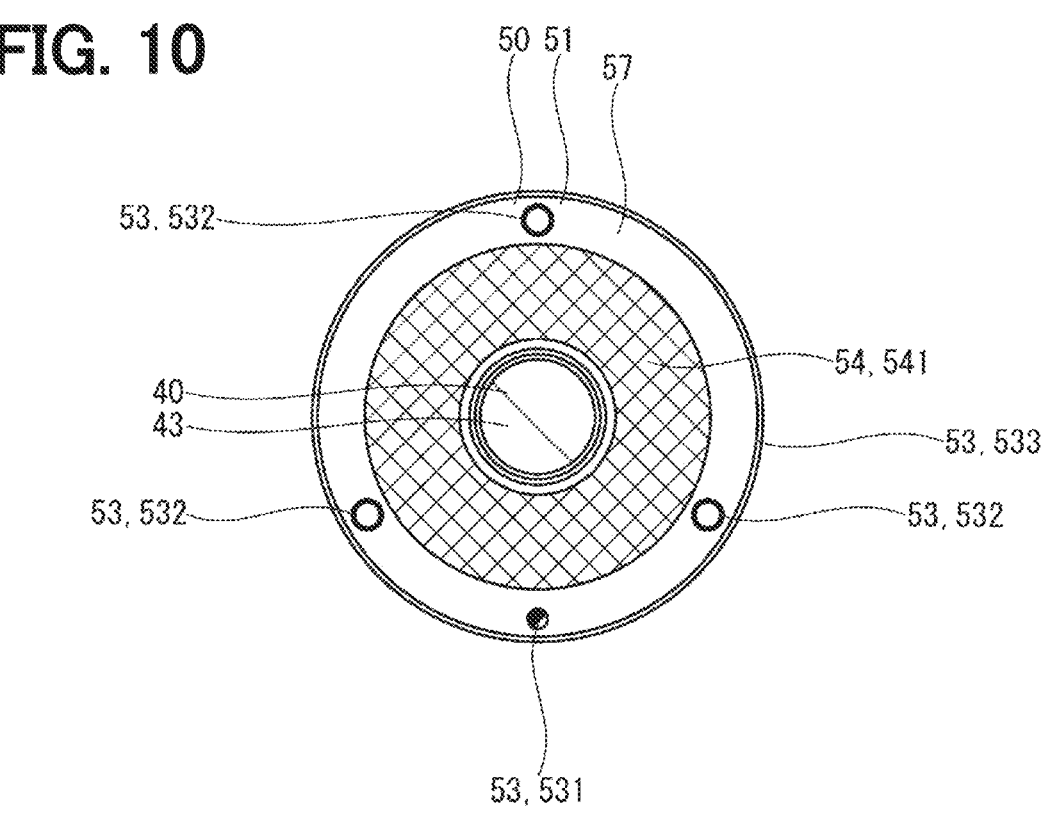
FIG. 10 is a cross-sectional view taken along line X-X in FIG. 9.
Figure 11:
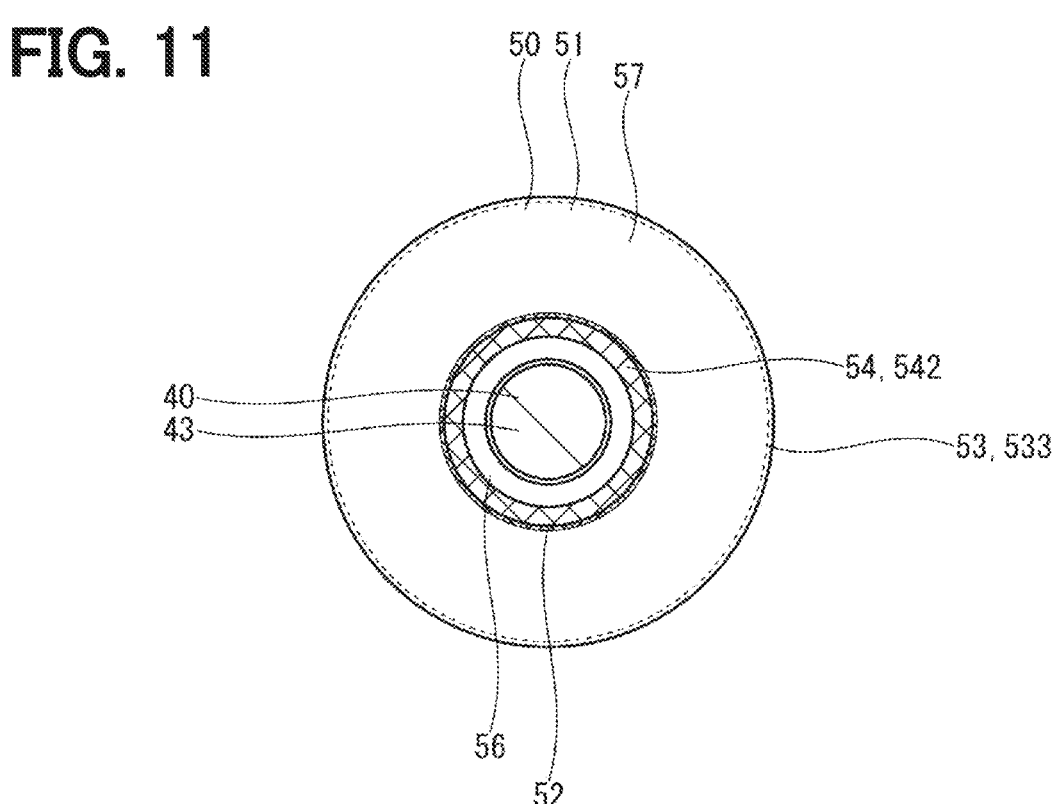
FIG. 11 is a cross-sectional view taken along line XI-XI in FIG. 9.

FIGS. 9 to 11 show a portion of the reaction force application device according to the third embodiment. The third embodiment differs from the first embodiment with respect to the structure of the contact member 50.

In the present embodiment, the contact member main body 51 has a main body shaft 56 and a main body flange 57. The main body shaft 56 is shaped generally in a cylindrical tubular form. The main body flange 57 is integrally formed with the main body shaft 56 in one-piece such that the main body flange 57 is shaped in an annular form and radially outwardly extends from an end portion of the main body shaft 56 which faces the retaining stopper 46.

The specific shape portion 531 is the gate mark shaped in the convex form formed on the contact member main body 51 during the molding and is located at an outer periphery of an end surface of the main body flange 57 which faces the retaining stopper 46 (see FIGS. 9 and 10). Each of the specific shape portions 532 is the ejector pin mark shaped in the annular convex form formed on the contact member main body 51 during the molding and is located at an outer periphery of an end surface of the main body flange 57 which faces the retaining stopper 46 (see FIGS. 9 and 10). The number of the specific shape portions 532 is three, and these three specific shape portions 532 are arranged at equal intervals in a circumferential direction at the main body flange 57 (see FIG. 10). The specific shape portion 533 is a burr shaped in an annular convex form formed on the contact member main body 51 during the molding and radially outwardly projects from the end portion of the main body flange 57 opposite to the retaining stopper 46 (see FIGS. 9 to 11).

The specific shape portion 531 and the specific shape portions 532 are located on the radially outer side of the retaining stopper 46 (see FIG. 9).

In the present embodiment, the contact surface portion 52, which is the surface that can be brought into contact with the pedal 70, is formed along an entire outer peripheral wall (also referred to as a specific range of the outer peripheral wall) of the main body shaft 56 located on the side of the main body flange 57 opposite to the retaining stopper 46 (see FIGS. 9 and 11). A slidable surface portion 541, which is a surface slidable relative to the retaining stopper 46 (serving as the another member), is shaped in an annular form and is positioned at an inner periphery of the end surface of the main body flange 57 which faces the retaining stopper 46 (see FIGS. 9 and 10). The slidable surface portion 542, which is a surface slidable relative to the lever main body 41 (serving as the another member) of the lever 40, is shaped in an annular form and is positioned at the end surface of the main body shaft 56 which is opposite to the main body flange 57 (see FIGS. 9 and 11).

As described above, each of the specific shape portions 53 is formed on the contact member main body 51 at the corresponding location that is different from the contact surface portion 52 and also different from the slidable surface portion 541 and the slidable surface portion 542. Therefore, during the depressing operation of the driver for depressing the pedal 70, the specific shape portions 53 do not come into contact with the pedal 70, thereby limiting the generation of the vibrations. Furthermore, for example, during the rotation of the contact member 50, the specific shape portions 53 can be limited from contacting the another member, thereby limiting the generation of the vibrations. Thus, it is possible to limit the vibrations from being transmitted to the driver through the pedal 70, similar to the first embodiment, thereby limiting the deterioration of the pedal force feeling of the driver.

Fourth Embodiment

Figure 12:
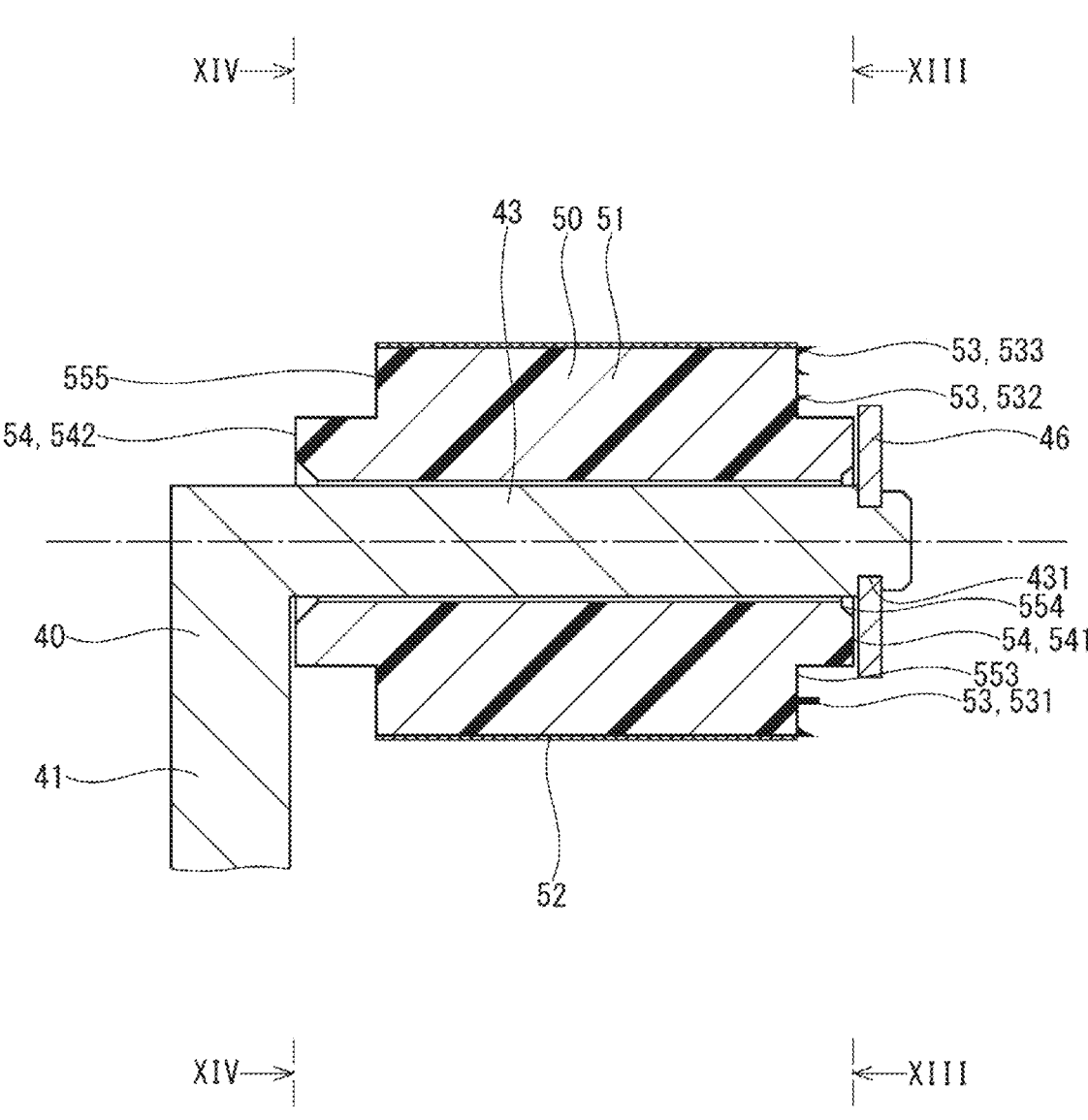
FIG. 12 is a cross-sectional view showing a contact member of a reaction force application device according to a fourth embodiment.
Figure 13:
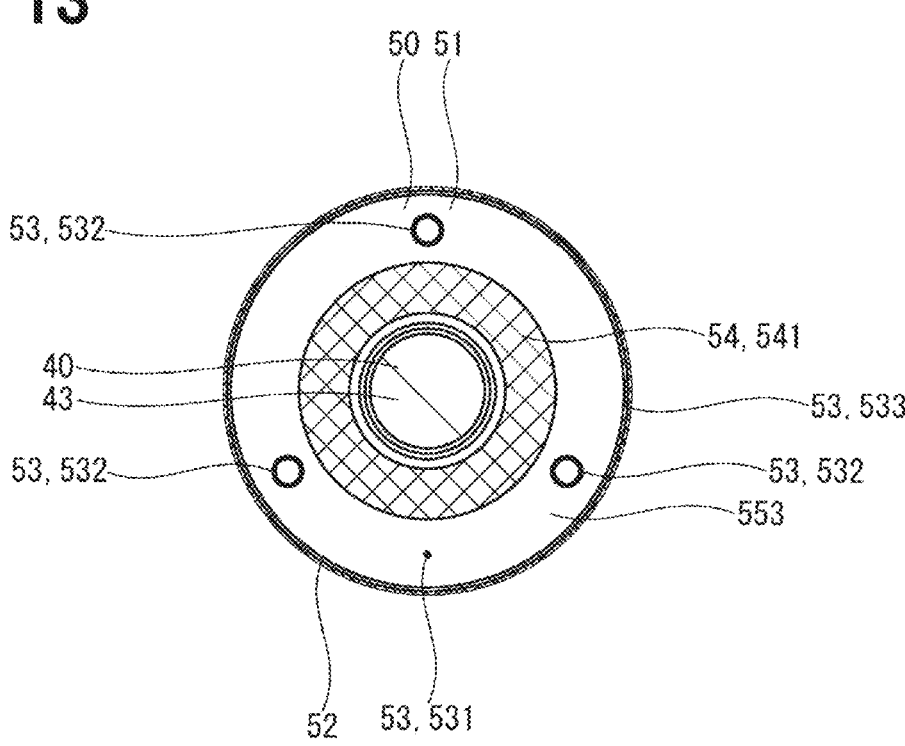
FIG. 13 is a cross-sectional view taken along line XIII-XIII n FIG. 12.
Figure 14:
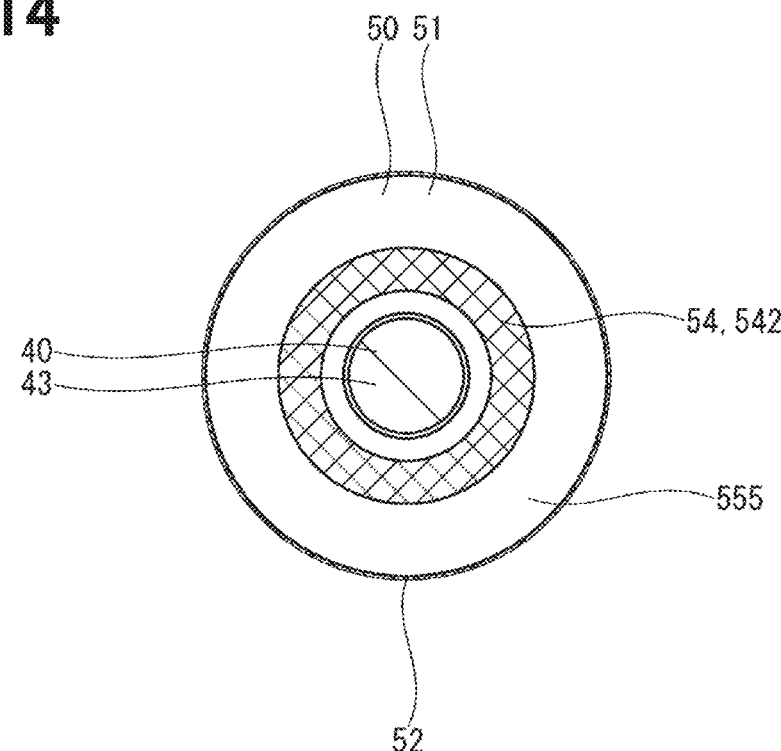
FIG. 14 is a cross-sectional view taken along line XIV-XIV in FIG. 12.

FIGS. 12 to 14 show a portion of the reaction force application device according to the fourth embodiment. The fourth embodiment differs from the first embodiment with respect to the structure of the contact member 50.

In the present embodiment, the contact member 50 has the member recess 553, the member recess 554 and a member recess 555. The member recess 553 is shaped in the annular form and is axially recessed from the outer periphery of the end surface of the contact member main body 51 which is opposite to the lever main body 41 (see FIGS. 12 and 13). A depth of the member recess 553 is deeper than the depth d3 of the member recess 553 of the first embodiment (see FIGS. 3 and 12). Furthermore, an inner diameter of the member recess 553 is smaller than an outer diameter of the retaining stopper 46. Therefore, a radial width of the member recess 553 is generally the same as a radial width of the contact member main body 51. The member recess 554 is shaped in the annular form and is axially recessed from the inner periphery of the end surface of the contact member main body 51 which is opposite to the lever main body 41 (see FIGS. 12 and 13). The member recess 555 is shaped in the annular form and is axially recessed from the outer periphery of the end surface of the contact member main body 51 which faces the lever main body 41 (see FIGS. 12 and 14). A depth of the member recess 555 is deeper than the depth d2 of the member recess 552 of the first embodiment (see FIGS. 3 and 12). Furthermore, an inner diameter of the member recess 555 is generally the same as the inner diameter of the member recess 553. An inner periphery of the end surface of the contact member main body 51, which faces the lever main body 41, is chamfered (see FIGS. 12 and 14).

The specific shape portion 531 is the gate mark shaped in the convex form formed on the contact member main body 51 during the molding and is located at a bottom surface of the member recess 553 (see FIGS. 12 and 13). Each of the specific shape portions 532 is the ejector pin mark shaped in the annular convex form formed on the contact member main body 51 during the molding and is located at the bottom surface of the member recess 553 (see FIGS. 12 and 13). The number of the specific shape portions 532 is three, and these three specific shape portions 532 are arranged at equal intervals in the circumferential direction at the member recess 553 (see FIG. 13). The specific shape portion 533 is the burr shaped in the annular convex form formed on the contact member main body 51 during the molding and projects from the outer periphery of the member recess 553 toward the side opposite to the lever main body 41 (see FIGS. 12 and 13).

In the present embodiment, the contact surface portion 52, which is the surface that can be brought into contact with the pedal 70, is formed on the entire outer peripheral wall of the contact member main body 51 between the member recess 553 and the member recess 555 (see FIGS. 12 and 13). The slidable surface portion 541, which is the surface slidable relative to the retaining stopper 46 (serving as the another member), is shaped in the annular form and is positioned between the member recess 553 and the member recess 554 (see FIGS. 12 and 13). The slidable surface portion 542, which is the surface slidable relative to the lever main body 41 (serving as the another member) of the lever 40, is shaped in an annular form and is positioned on a radially inner side of the member recess 555 (see FIGS. 12 and 14).

As described above, each of the specific shape portions 53 is formed on the contact member main body 51 at the corresponding location that is different from the contact surface portion 52 and also different from the slidable surface portions 541 and the slidable surface portion 542.

In the present embodiment, a surface area of each of the contact surface portion 52, the slidable surface portion 541 and the slidable surface portion 542 is smaller than that of the first embodiment (see FIGS. 3 to 5 and 12 to 14). Therefore, the sliding torque between the contact member 50 and the another member can be reduced.

Fifth Embodiment

Figure 15:
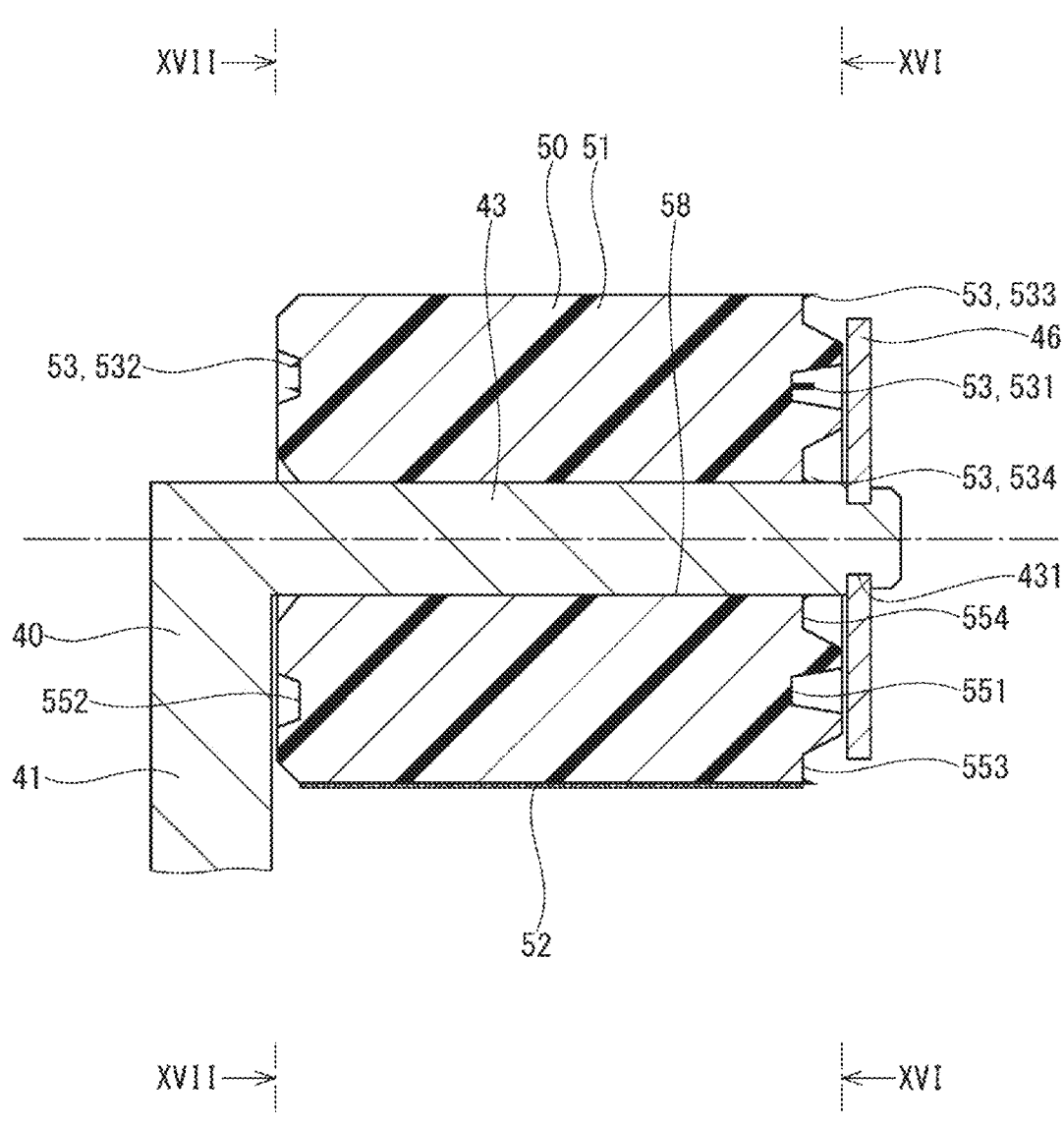
FIG. 15 is a cross-sectional view showing a contact member of a reaction force application device according to a fifth embodiment.
Figure 16:
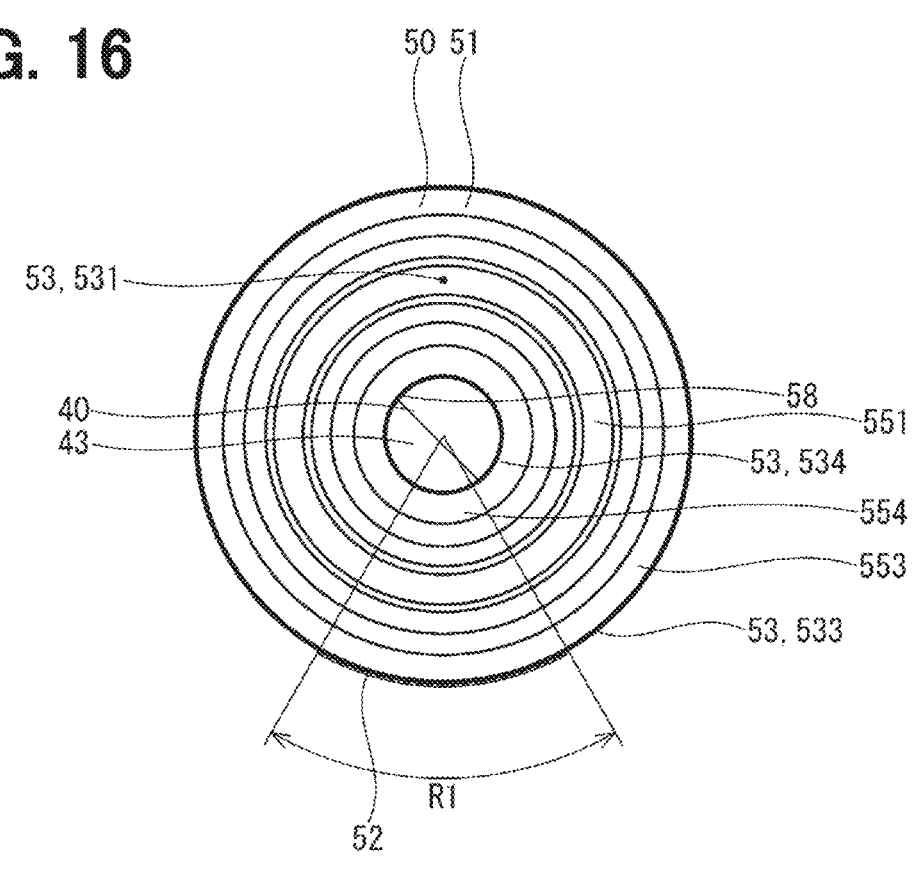
FIG. 16 is a cross-sectional view taken along line XVI-XVI in FIG. 15.
Figure 17:
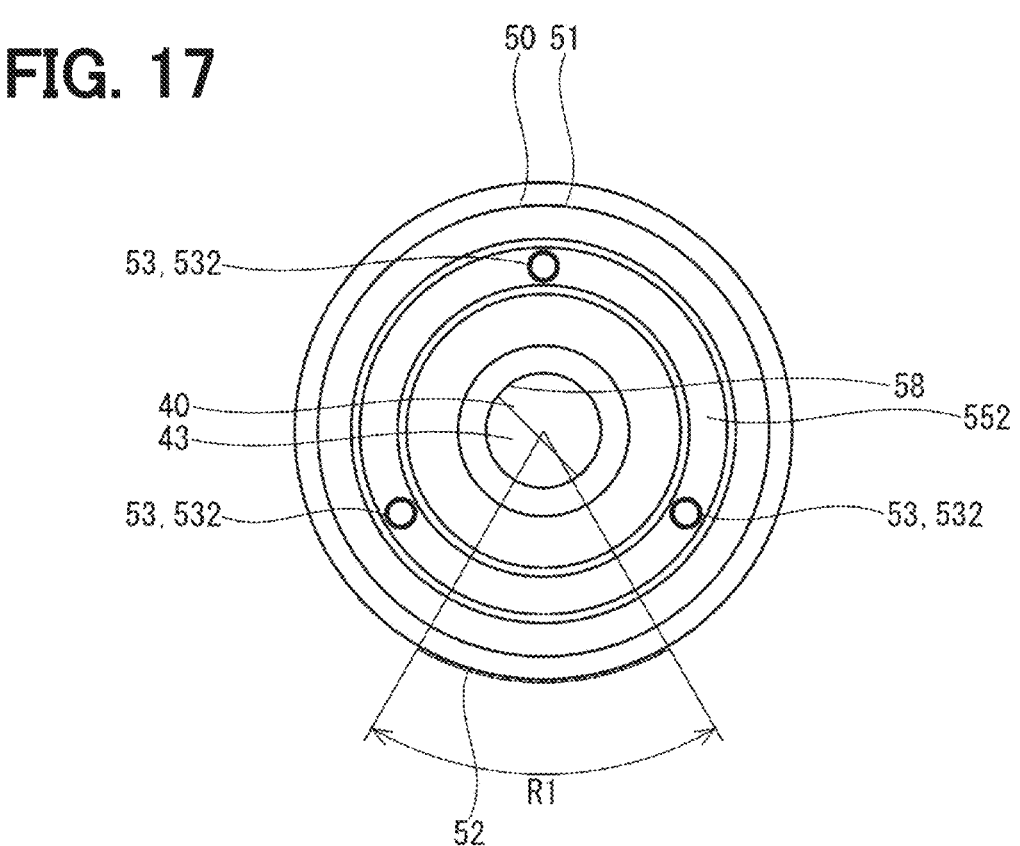
FIG. 17 is a cross-sectional view taken along line XVII-XVII n FIG. 15.

FIGS. 15 to 17 show a portion of the reaction force application device according to the fifth embodiment. The fifth embodiment differs from the first embodiment with respect to the structure of the contact member 50.

The contact member 50 has a fixing portion 58 which can fix the contact member main body 51 to the lever 40. The fixing portion 58 is formed on the contact member 50 at a location that is different from the contact surface portion 52.

Each of the specific shape portions 53 is formed at the corresponding location where the specific shape portion 53 does not come in contact with the fixing portion 58.

More specifically, in the present embodiment, the fixing portion 58 is formed at an inner peripheral wall of the contact member main body 51. An inner diameter of the contact member main body 51 is smaller than the outer diameter of the other-side lever end portion 43. The contact member 50 is fixed to the other-side lever end portion 43 by press-fitting or adhesion such that the contact member 50 is not rotatable relative to and is not axially movable relative to the other-side lever end portion 43.

In the present embodiment, since the contact member 50 is not rotatable relative to the other-side lever end portion 43, the sliding of the contact member 50 relative to the retaining stopper 46 (serving as the another member) and the lever main body 41 (serving as the another member) of the lever 40 is limited. Therefore, the slidable surface portions 54, as shown in the first embodiment, are not formed on the contact member main body 51 (see FIGS. 15 to 17).

Additionally, since the contact member 50 is not rotatable relative to the other-side lever end portion 43, the contact surface portion 52, which is the surface that can contact the pedal 70, is set within a specific circumferential range (also referred to as a specific range) R1 of the outer peripheral wall of the contact member main body 51 (see FIGS. 15 to 17).

In the present embodiment, when the driver performs the depressing operation of the pedal 70, the contact member 50 can slide relative to the pedal 70.

As described above, each of the specific shape portions 53 is formed on the contact member main body 51 at the corresponding location, which is different from the contact surface portion 52, and at which the specific shape portion 53 does not come in contact with the fixing portion 58.

As described above, in the present embodiment, the contact member 50 has the fixing portion 58 which can fix the contact member main body 51 to the lever 40. The fixing portion 58 is formed on the contact member 50 at a location that is different from the contact surface portion 52.

Therefore, during the depressing operation of the driver for depressing the pedal 70, the fixing portion 58 and the pedal 70 do not come in contact with each other, thereby limiting the generation of the vibrations. Thus, it is possible to limit the vibrations from being transmitted to the driver through the pedal 70, thereby limiting the deterioration of the pedal force feeling of the driver.

Furthermore, in the present embodiment, each of the specific shape portions 53 is formed at the corresponding location where the specific shape portion 53 does not come in contact with the fixing portion 58.

Therefore, the fixed state of the contact member main body 51 and the lever 40, which are fixed together by the fixing portion 58, can be stabilized.

Sixth Embodiment

Figure 18:
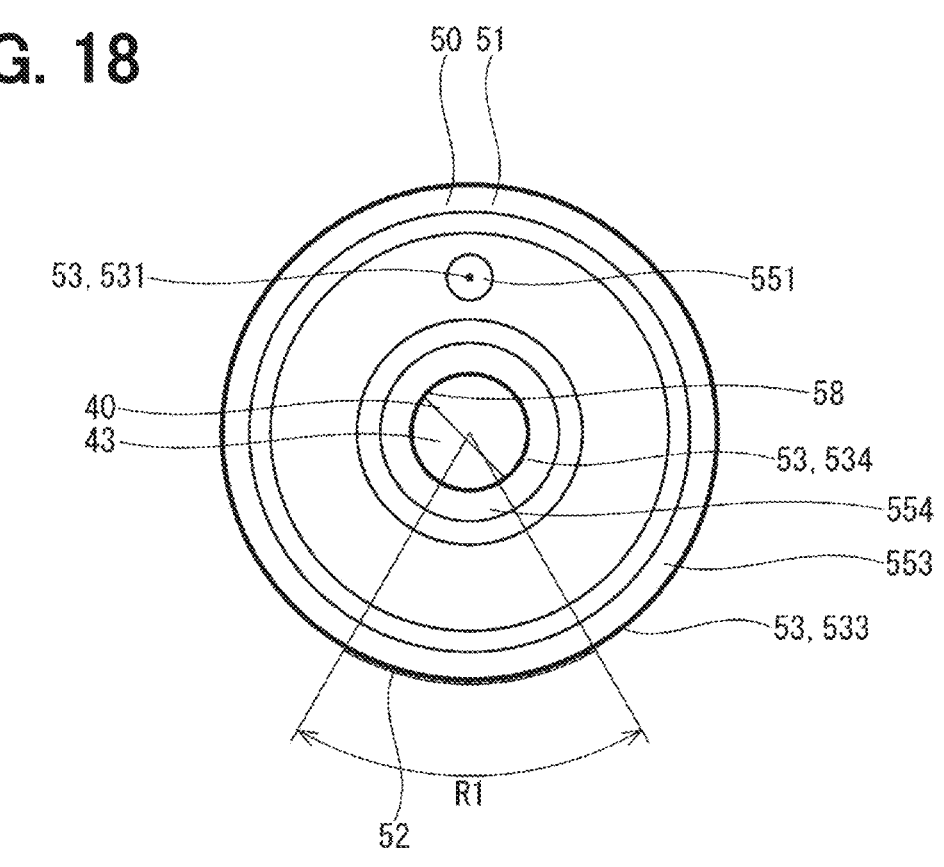
FIG. 18 is a diagram showing a contact member of a reaction force application device according to a sixth embodiment.
Figure 19:
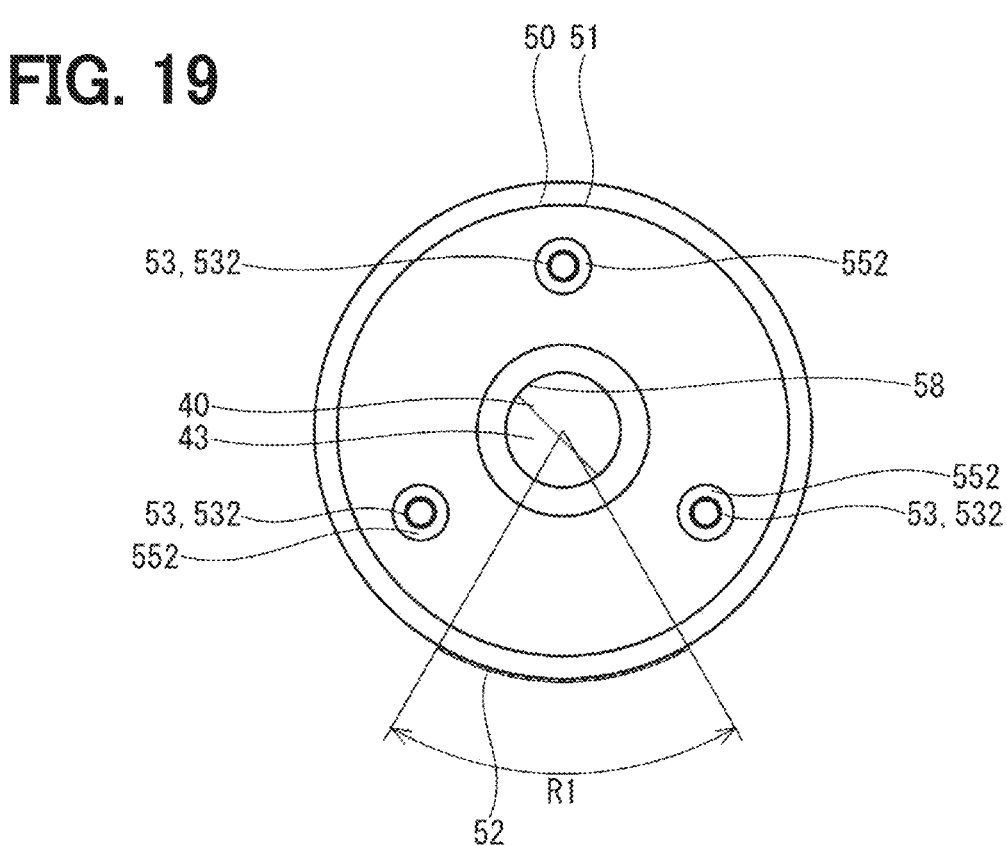
FIG. 19 is a diagram showing the contact member of the reaction force application device according to the sixth embodiment.

FIGS. 18 and 19 show a portion of the reaction force application device according to the sixth embodiment. The sixth embodiment differs from the fifth embodiment with respect to the structure of the contact member 50.

In the present embodiment, the member recess 551 is not shaped in the annular form and is merely axially recessed from the end surface of the contact member main body 51 which is opposite to the lever main body 41 (see FIG. 18). The specific shape portion 531 is formed at a bottom surface of the member recess 551.

In the present embodiment, each of a plurality of member recesses 552 is not shaped in the annular form and is merely axially recessed from the end surface of the contact member main body 51 which faces the lever main body 41 (see FIG. 19). The number of the member recesses 552 is three, and these three member recesses 552 are arranged at equal intervals in the circumferential direction of the contact member main body 51. Each of the specific shape portions 532 is formed at a bottom surface of a corresponding one of the three member recesses 552.

As described above, each of the member recess 551 and the member recesses 552 may be formed only around the corresponding one of the specific shape portion 531 and the specific shape portions 532.

Seventh Embodiment

Figure 20:
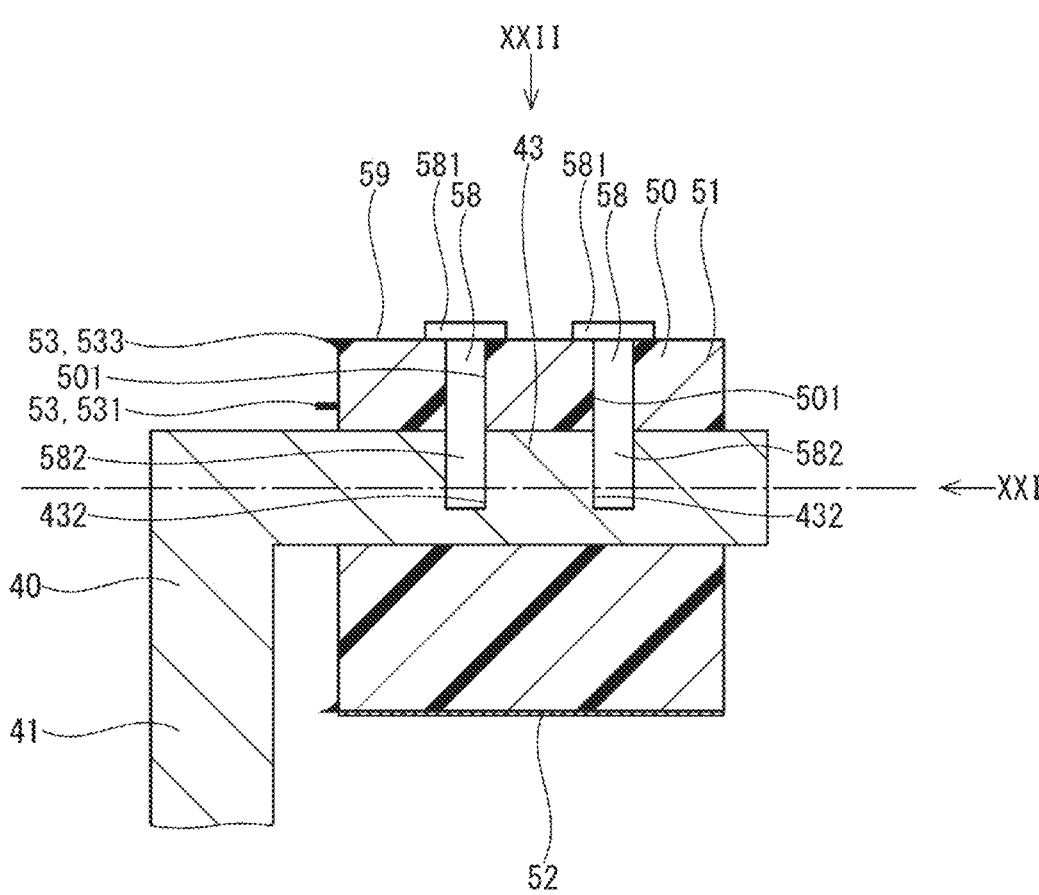
FIG. 20 is a cross-sectional view showing a contact member of a reaction force application device according to a seventh embodiment.
Figure 21:
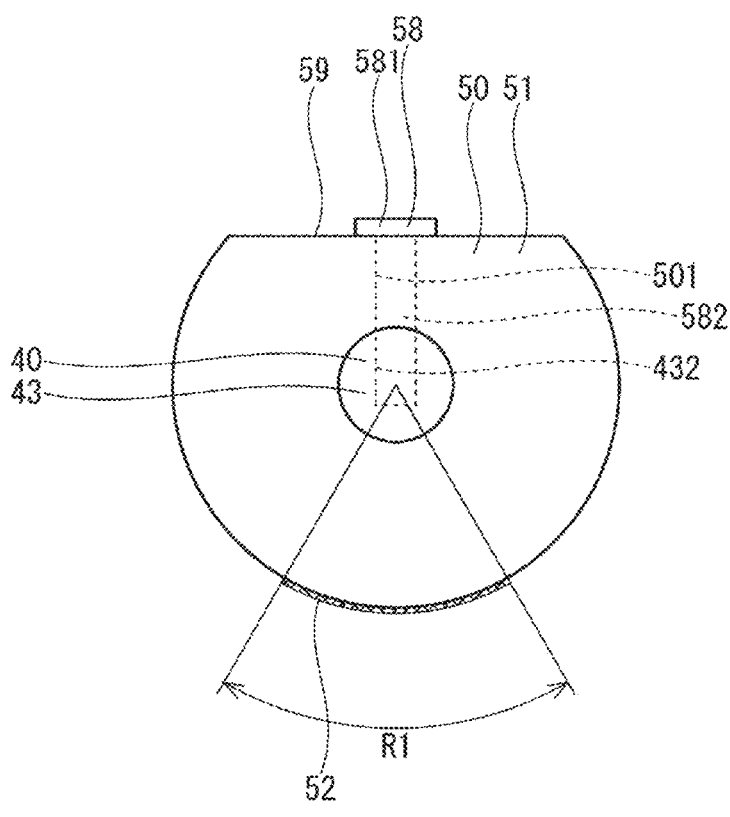
FIG. 21 is a view taken in a direction of an arrow XXI in FIG. 20.
Figure 22:
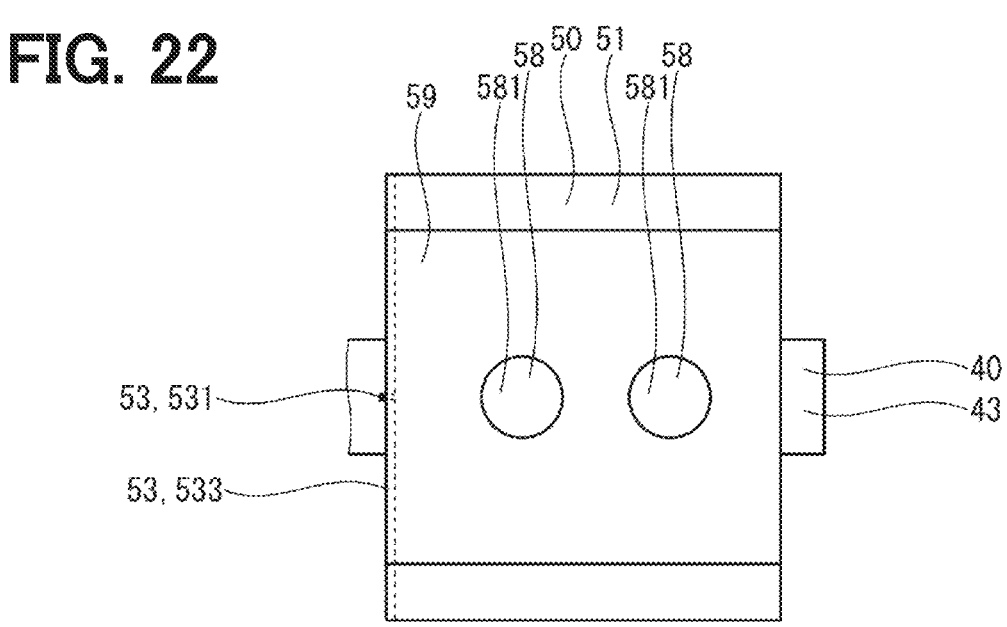
FIG. 22 is a view taken in a direction of an arrow XXII-XXII in FIG. 20.

FIGS. 20 to 22 show a portion of the reaction force application device according to the seventh embodiment. The seventh embodiment differs from the first embodiment with respect to the structure of the contact member 50.

In the present embodiment, the contact member 50 does not have the member recess 551, the member recess 552, the member recess 553 and the member recess 554, but has a member planar surface portion 59. The member planar surface portion 59 is shaped in a planar surface form such that the member planar surface portion 59 is recessed from the outer peripheral wall of the contact member main body 51 at a circumferential section of the contact member main body 51.

The contact member main body 51 has a plurality of member through-holes 501 each of which connects between the inner peripheral wall of the contact member main body 51 and the member planar surface portion 59. The number of the member through-holes 501 is two, and these two member through-holes 501 are arranged at a predetermined interval in the axial direction of the contact member main body 51. The other-side lever end portion 43 has a plurality of lever holes 432 each of which is recessed in a form of a hole from the outer peripheral wall of the other-side lever end portion 43 toward a radially inner side of the other-side lever end portion 43. The number of the lever holes 432 is two, and these two lever holes 432 are arranged at a predetermined interval in the axial direction of the other-side lever end portion 43, similar to the member through-holes 501. In the present embodiment, the retaining stopper 46 is not provided.

In the present embodiment, a plurality (two in this instance) of fixing portions 58 are provided. Each of the fixing portions 58 is, for example, a screw, and has a fixing portion head 581 and a fixing portion shaft 582. The fixing portion head 581 is shaped generally in a circular plate form. The fixing portion shaft 582 axially extends from a center of the fixing portion head 581. Each of the fixing portions 58 is provided such that the fixing portion shaft 582 passes through the corresponding member through-hole 501 of the contact member 50 and is threadably engaged with the corresponding lever hole 432 of the other-side lever end portion 43. Therefore, the contact member 50 is fixed to the other-side lever end portion 43 such that the contact member 50 is not rotatable relative to and is not axially movable relative to the other-side lever end portion 43.

The specific shape portion 531 is the gate mark shaped in the convex form formed on the contact member main body 51 during the molding and is located at the end surface of the contact member main body 51 which faces the lever main body 41 (see FIGS. 20 and 22). The specific shape portion 533 is the burr shaped in the annular convex form formed on the contact member main body 51 during the molding and projects from the outer periphery of the end surface of the contact member main body 51, which faces the lever main body 41, toward the lever main body 41 (see FIGS. 20 and 22).

In the present embodiment, since the contact member 50 is not axially movable relative to the other-side lever end portion 43, the specific shape portion 531 and the specific shape portion 533 do not come into contact with the lever main body 41.

As described above, each of the specific shape portions 53 is formed on the contact member main body 51 at the corresponding location, which is different from the contact surface portion 52, and at which the specific shape portion 53 does not come in contact with the fixing portion 58.

Eighth Embodiment

Figure 23:
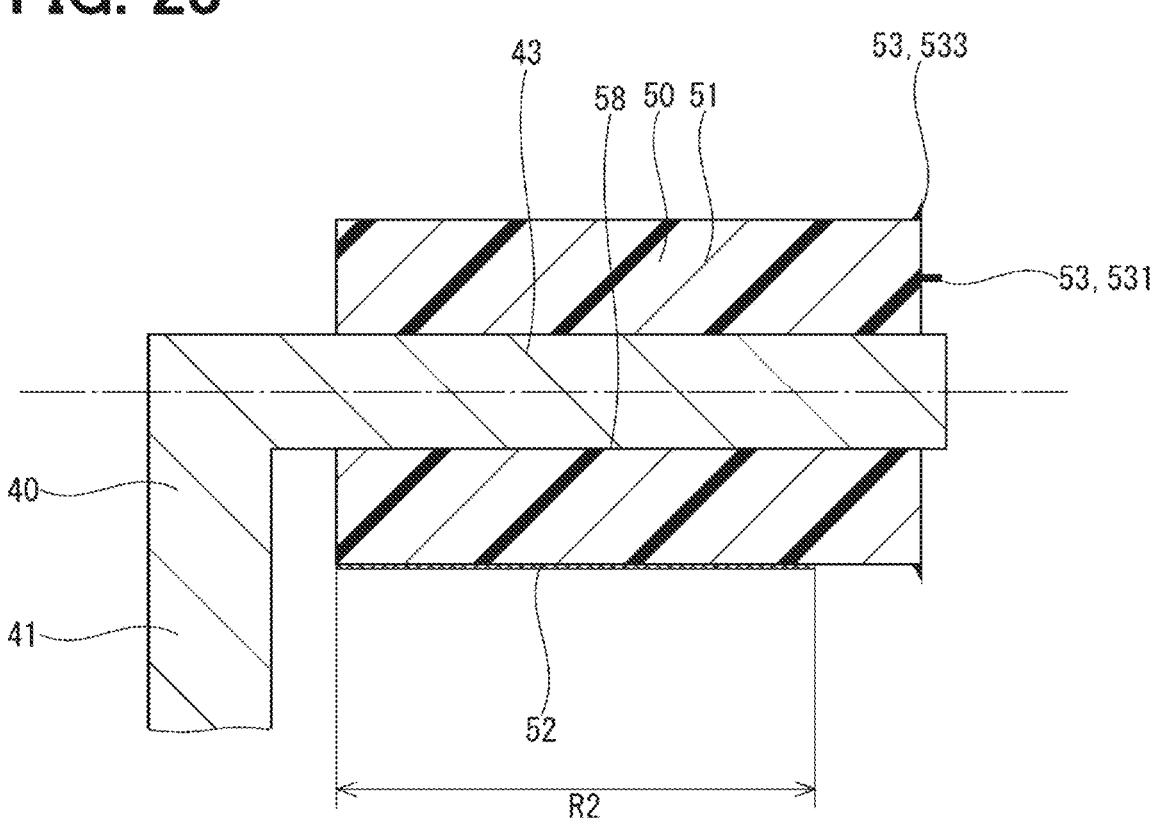
FIG. 23 is a cross-sectional view showing a contact member of a reaction force application device according to an eighth embodiment.

FIG. 23 shows a portion of the reaction force application device according to the eighth embodiment. The eighth embodiment differs from the fifth embodiment with respect to the structure of the contact member 50.

In the present embodiment, the contact member 50 does not have the member recess 551, the member recess 552, the member recess 553 and the member recess 554, and the contact member main body 51 is shaped in a simple cylindrical tubular form. Additionally, the retaining stopper 46 is not provided.

The specific shape portion 531 is the gate mark shaped in the convex form formed on the contact member main body 51 during the molding and is located at the end surface of the contact member main body 51 which is opposite to the lever main body 41 (see FIG. 23). The specific shape portion 533 is the burr shaped in the annular convex form formed on the contact member main body 51 during the molding and radially outwardly projects from the end portion of the contact member main body 51, which is opposite to the lever main body 41 (see FIG. 23).

In the present embodiment, since the contact member 50 is fixed to the other-side lever end portion 43 by the fixing portion 58, the contact surface portion 52, which is the surface that can contact the pedal 70, is set within a specific axial range R2 of the outer peripheral wall of the contact member main body 51 at the lever main body 41 side (see FIG. 23).

As described above, each of the specific shape portions 53 is formed on the contact member main body 51 at the corresponding location, which is different from the contact surface portion 52, and at which the specific shape portion 53 does not come in contact with the fixing portion 58.

Ninth Embodiment

Figure 24:
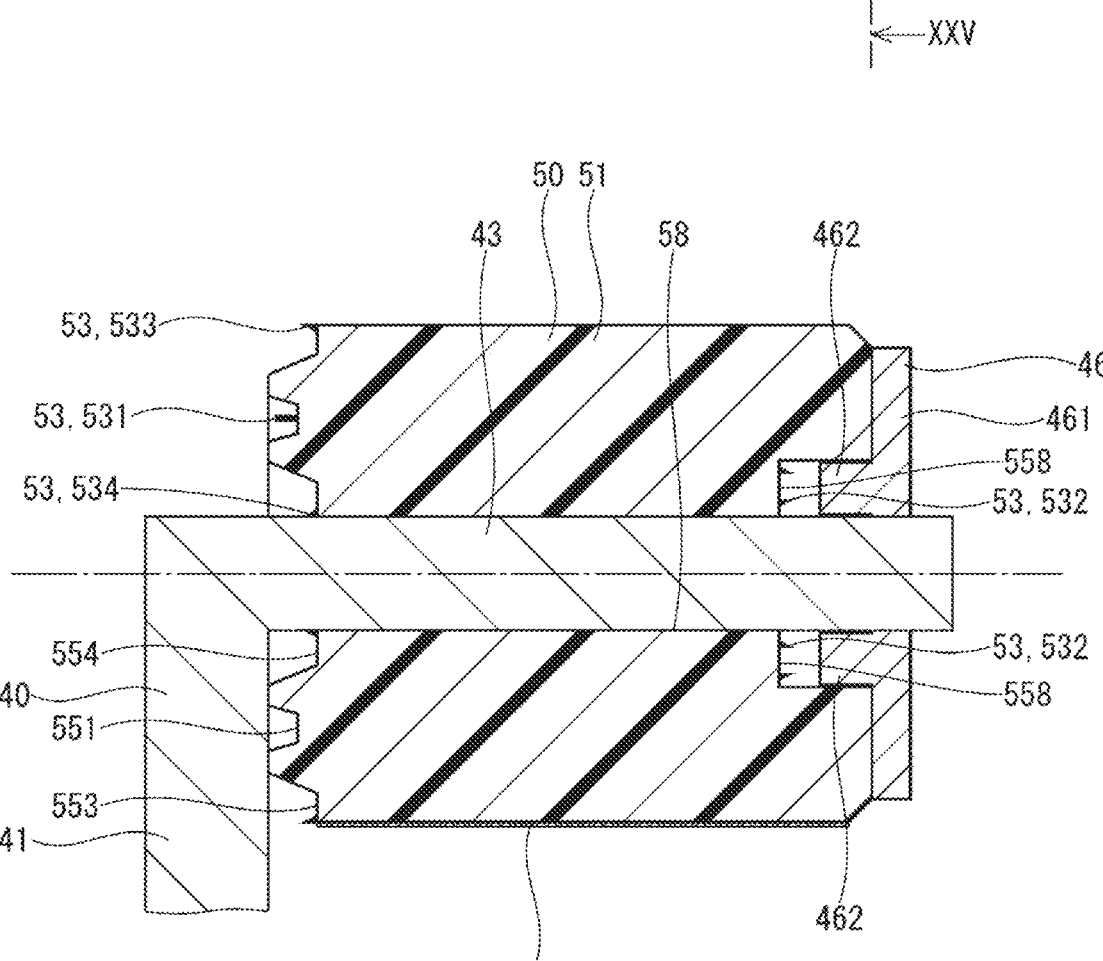
FIG. 24 is a cross-sectional view showing a contact member of a reaction force application device according to a ninth embodiment.
Figure 24:
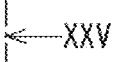
Figure 25:
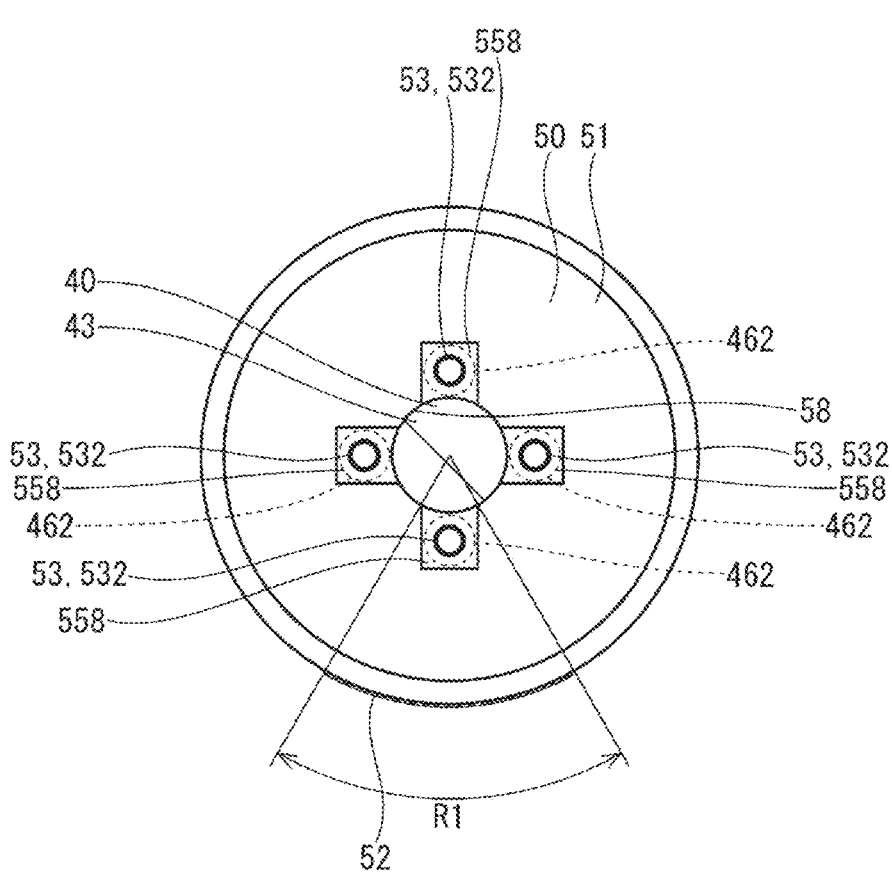
FIG. 25 is a cross-sectional view taken along line XXV-XXV in FIG. 24.

FIGS. 24 and 25 show a portion of the reaction force application device according to the ninth embodiment. The ninth embodiment differs from the fifth embodiment with respect to the structures of the contact member 50 and the retaining stopper 46.

In the present embodiment, the contact member 50 does not have the member recess 552 but has a plurality of member recesses 558.

The member recess 551 is shaped in the annular form and is axially recessed from the end surface of the contact member main body 51 which faces the lever main body 41 (see FIG. 24). The member recess 553 is shaped in the annular form and is axially recessed from the outer periphery of the end surface of the contact member main body 51 which faces the lever main body 41 (see FIG. 24). The member recess 554 is shaped in the annular form and is axially recessed from the inner periphery of the end surface of the contact member main body 51 which faces the lever main body 41 (see FIG. 24). The outer periphery of the end surface of the contact member main body 51, which is opposite to the lever main body 41, is chamfered (see FIG. 24).

The specific shape portion 531 is the gate mark shaped in the convex form formed on the contact member main body 51 during the molding and is located at the bottom surface of the member recess 551 (see FIG. 24). The specific shape portion 533 is the burr shaped in the annular convex form formed on the contact member main body 51 during the molding and projects from the outer periphery of the member recess 553 toward the lever main body 41 (see FIG. 24). The specific shape portion 534 is the burr shaped in the annular convex form formed on the contact member main body 51 during the molding and projects from the inner periphery of the member recess 554 toward the lever main body 41 (see FIG. 24).

Each of the member recesses 558 is axially recessed from the end surface of the contact member main body 51, which is opposite to the lever main body 41 (see FIGS. 24 and 25). The number of the member recesses 558 is four, and these four member recesses 558 are arranged at equal intervals in the circumferential direction of the contact member main body 51 (see FIG. 25).

Each of the specific shape portions 532 is the ejector pin mark shaped in the annular convex form formed on the contact member main body 51 during the molding and is located at the bottom surface of the corresponding member recess 558 (see FIGS. 24 and 25). Therefore, the number of the specific shape portions 532 is four, and these four specific shape portions 532 are arranged at equal intervals in the circumferential direction of the contact member main body 51 (see FIG. 25).

In the present embodiment, the retaining stopper 46 has a retaining stopper main body 461 and a plurality of rotation stopper projections 462. The retaining stopper main body 461 is shaped in an annular plate form. Each of the rotation stopper projections 462 axially projects from an inner periphery of the retaining stopper main body 461 (see FIG. 24). The number of the rotation stopper projections 462 is four, and these four rotation stopper projections 462 are arranged at equal intervals in the circumferential direction of the retaining stopper main body 461 (see FIG. 25).

The retaining stopper 46 is configured such that the rotation stopper projections 462 enter the member recesses 558, respectively, and the inner periphery of the retaining stopper main body 461 is press-fitted over the other-side lever end portion 43, and thereby the retaining stopper 46 is not rotatable relative to and is not axially movable relative to the other-side lever end portion 43. Thus, the contact member 50 is clamped between the lever main body 41 and the retaining stopper 46 such that the end surface of the contact member main body 51, which faces the lever main body 41, is in contact with the lever main body 41, and the other end surface of the contact member main body 51, which is opposite to the lever main body 41, is in contact with the retaining stopper main body 461. In addition, since the rotation stopper projections 462 are inserted into the member recesses 558, respectively, the rotation of the contact member 50 relative to the other-side lever end portion 43 can be reliably limited.

A distance between the bottom surface of each member recess 558 and the corresponding rotation stopper projection 462 is larger than a projecting height of the corresponding specific shape portion 532 (see FIG. 24). Therefore, the specific shape portion 532 does not come into contact with the rotation stopper projection 462.

As described above, each of the specific shape portions 53 is formed on the contact member main body 51 at the corresponding location, which is different from the contact surface portion 52, and at which the specific shape portion 53 does not come in contact with the fixing portion 58.

Tenth Embodiment

Figure 26:
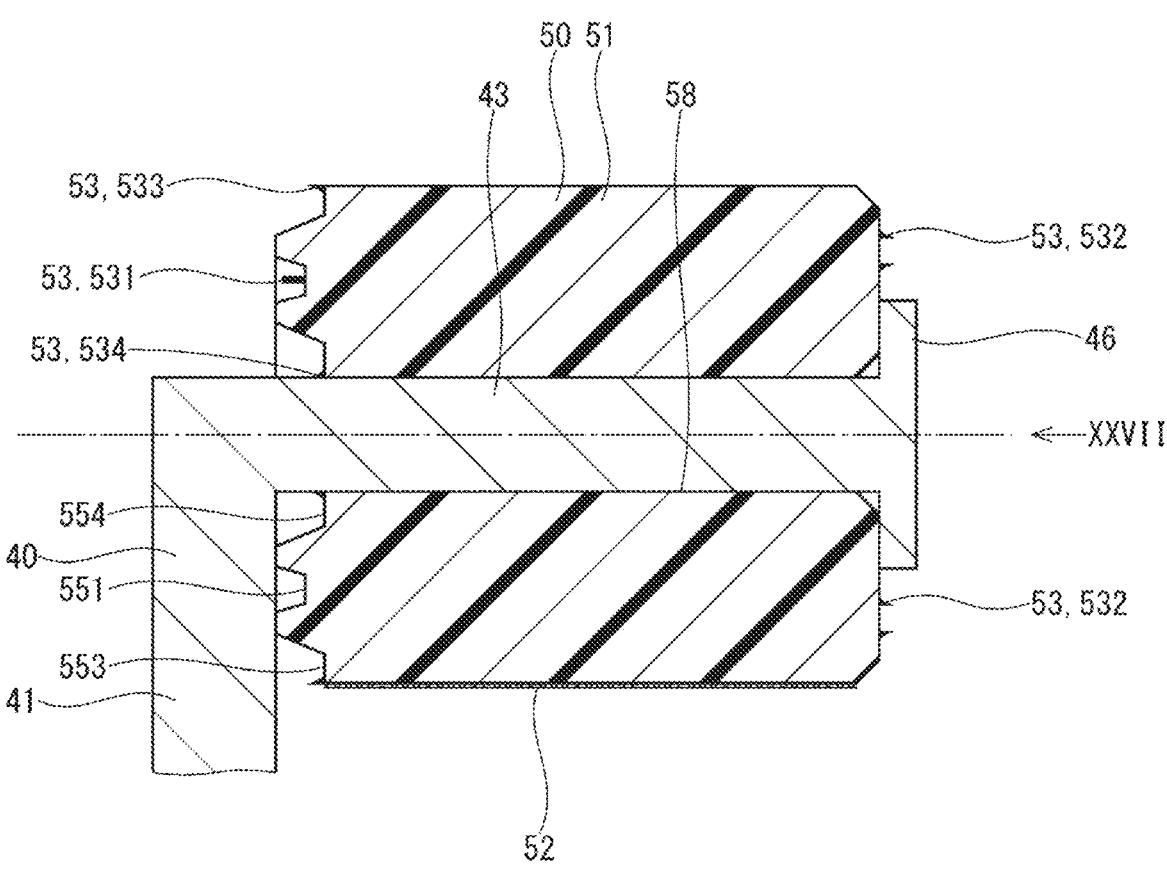
FIG. 26 is a cross-sectional view showing a contact member of a reaction force application device according to a tenth embodiment.
Figure 27:
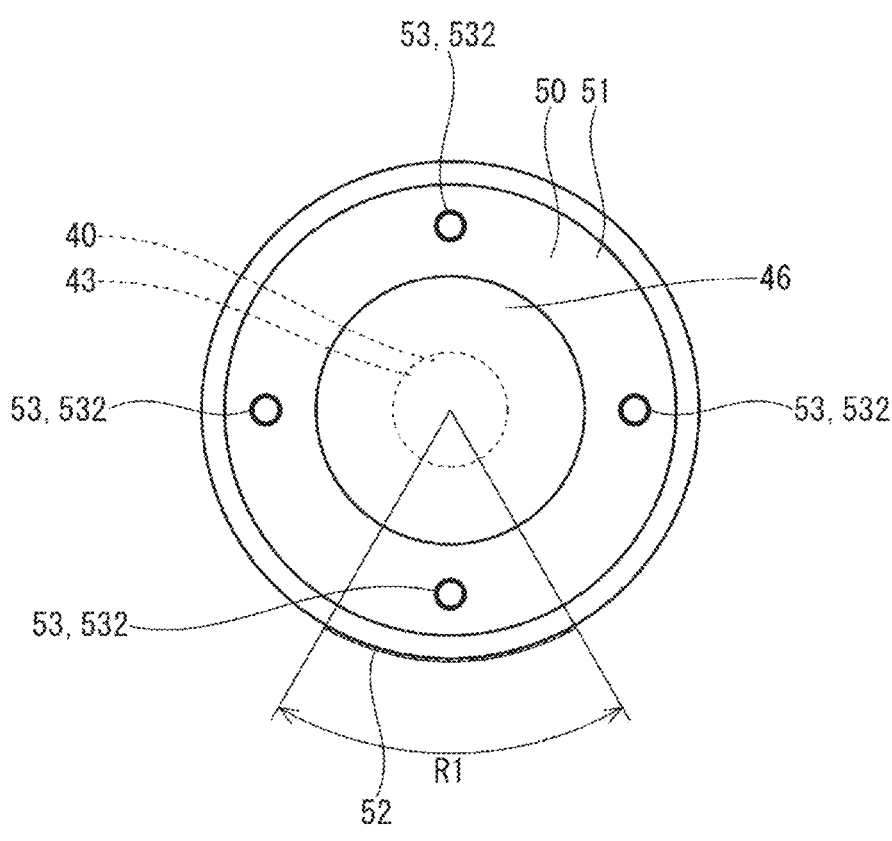
FIG. 27 is a view taken in a direction of an arrow XXVII in FIG. 26.

FIGS. 26 and 27 show a portion of the reaction force application device according to the tenth embodiment. The tenth embodiment differs from the ninth embodiment with respect to the structures of the contact member 50 and the retaining stopper 46.

In the present embodiment, the contact member 50 does not have the member recess 558.

In the present embodiment, the retaining stopper 46 is integrally formed with the other-side lever end portion 43 in one-piece so as to radially outwardly extend in an annular form from the end portion of the other-side lever end portion 43 opposite to the lever main body 41. The retaining stopper 46 is formed, for example, by a swaging process (heading process). Thus, the contact member 50 is clamped between the lever main body 41 and the retaining stopper 46 such that the end surface of the contact member main body 51, which faces the lever main body 41, is in contact with the lever main body 41, and the other end surface of the contact member main body 51, which is opposite to the lever main body 41, is in contact with the retaining stopper 46.

A plurality of specific shape portions 532 are formed at the end surface of the contact member main body 51, which is opposite to the lever main body 41, on the radially outer side of the retaining stopper 46 (see FIGS. 26 and 27). The number of the specific shape portions 532 is four, and these four specific shape portions 532 are arranged at equal intervals in the circumferential direction of the contact member main body 51 (see FIG. 27).

As described above, each of the specific shape portions 53 is formed on the contact member main body 51 at the corresponding location, which is different from the contact surface portion 52, and at which the specific shape portion 53 does not come in contact with the fixing portion 58.

Other Embodiments

In the embodiments described above, there is described the example, in which the specific shape portions are the convex gate mark, the annular convex ejector pin marks, or the annular convex burrs formed on the contact member main body during the molding. In contrast, in another embodiment, the specific shape portions may be parting line steps or concave portions formed on the contact member main body during the molding.

Furthermore, in another embodiment, the number of the specific shape portions formed on the contact member may be set to any number depending on the size, the shape and the material type of the contact member. In the sixth embodiment, there are provided the three member recesses 552, in each of which the specific shape portion 532 as the ejector pin mark is formed at the bottom surface thereof. In the ninth embodiment, there are provided the four member recesses 558, in each of which the specific shape portion 532 is formed at the bottom surface and into which the rotation stopper projection 462 can be inserted. In contrast, in another embodiment, the number of the member recesses, such as the member recesses 552, 558, may be determined according to the number of specific shape portions to be formed.

Furthermore, in another embodiment, the wall surface of the floor panel of the vehicle, to which the reaction force application device and the accelerator device are installed, is not necessarily formed parallel to the y-z plane. That is, the wall surface of the floor panel may be formed at any angle relative to the vehicle.

Furthermore, the reaction force application device and the accelerator device according to the present disclosure may also be applied to vehicles other than the automobiles.

As described above, the present disclosure is not limited to the embodiments described above and can be implemented in various forms without departing from the spirit of the present disclosure.

The present disclosure has been described with reference to the embodiments. However, the present disclosure is not limited to the above embodiments and the structures described therein. The present disclosure also includes various variations and variations within the equivalent range. Also, various combinations and forms, as well as other combinations and forms that include only one element, more, or less, are within the scope and ideology of the present disclosure.

What is claimed is:

1. A reaction force application device configured to apply a reaction force against a pedal force of a human driver to a pedal of an accelerator device to be depressed by the human driver, the reaction force application device comprising:
   an actuator that is configured to generate a drive force in response to energization of the actuator;
   a lever that is configured to be rotated by the drive force transmitted from the actuator to apply the reaction force to one of the pedal and an arm, wherein the arm is configured to be rotated integrally with the pedal; and
   a contact member that is provided to the lever, wherein the contact member is configured to be brought into contact with or separated from the one of the pedal and the arm, wherein:
   the lever includes:
      a lever main body that is shaped in a rod form;
      a one-side lever end portion that is formed at one end of the lever main body and is configured to receive the drive force transmitted from the actuator; and
      an other-side lever end portion that is formed at another end of the lever main body, which is opposite to the one end of the lever main body;
   the contact member is made of resin and has:
      a contact member main body that is shaped in a tubular form;
      a contact surface portion that is formed in a specific range of an outer peripheral surface of the contact member main body and is configured to contact the one of the pedal and the arm; and
      a specific shape portion that is shaped in a form of a projection or a recess and is formed on the contact member main body at a time of molding the contact member, wherein the contact member is provided to the lever such that the other-side lever end portion is inserted through an inside of the contact member main body;
   the specific shape portion is formed on the contact member main body at a corresponding location that is different from the contact surface portion;
   the contact member has a slidable surface portion that is formed in a specific range of an end surface of the contact member main body, which faces in an axial direction of the contact member main body, wherein the slidable surface portion is configured to rotate relative to the other-side lever end portion and is slidable relative to another member; and
   the specific shape portion is formed on the contact member main body at the corresponding location that is different from the slidable surface portion.

2. The reaction force application device according to claim 1, wherein:
   the contact member has a member recess that is recessed from the end surface of the contact member main body, which faces in the axial direction; and
   the specific shape portion is one of a plurality of specific shape portions, and at least one of the plurality of specific shape portions is formed at a bottom surface of the member recess.

3. The reaction force application device according to claim 2, wherein a depth of the member recess is larger than a projecting height of the at least one of the plurality of specific shape portions.

4. A reaction force application device configured to apply a reaction force against a pedal force of a human driver to a pedal of an accelerator device to be depressed by the human driver, the reaction force application device comprising:
   an actuator that is configured to generate a drive force in response to energization of the actuator;
   a lever that is configured to be rotated by the drive force transmitted from the actuator to apply the reaction force to one of the pedal and an arm, wherein the arm is configured to be rotated integrally with the pedal; and
   a contact member that is provided to the lever, wherein the contact member is configured to be brought into contact with or separated from the one of the pedal and the arm, wherein:
   the lever includes:
      a lever main body that is shaped in a rod form;
      a one-side lever end portion that is located at and formed integrally in one-piece with one end of the lever main body and is configured to receive the drive force transmitted from the actuator; and
      an other-side lever end portion that is located at and formed integrally in one-piece with another end of the lever main body, which is opposite to the one end of the lever main body;
   the contact member is made of resin and has:
      a contact member main body that is shaped in a tubular form;
      a contact surface portion that is formed in a specific range of an outer peripheral surface of the contact member main body and is configured to contact the one of the pedal and the arm; and
      a specific shape portion that is shaped in a form of a projection or a recess and is formed on the contact member main body at a time of molding the contact member, wherein the contact member is provided to the lever such that the other-side lever end portion is inserted through an inside of the contact member main body;

the specific shape portion is formed on the contact member main body at a corresponding location that is different from the contact surface portion;

the contact member has a fixing portion that is configured to fix the contact member main body to the other-side lever end portion to limit rotation of the contact member main body relative to the other-side lever end portion; and the fixing portion is formed on the contact member at a location that is different from the contact surface portion.

5. The reaction force application device according to claim 4, wherein the specific shape portion is formed at the corresponding location where the specific shape portion does not come in contact with the fixing portion.

6. The reaction force application device according to claim 4, wherein:

the contact member has a member recess that is recessed from an end surface of the contact member main body, which faces in an axial direction; and the specific shape portion is one of a plurality of specific shape portions, and at least one of the plurality of specific shape portions is formed at a bottom surface of the member recess.

7. The reaction force application device according to claim 6, wherein a depth of the member recess is larger than a projecting height of the at least one of the plurality of specific shape portions.

* * * * *